(12) United States Patent
Kasamatsu

(10) Patent No.: US 9,438,776 B2
(45) Date of Patent: Sep. 6, 2016

(54) POSITION DETECTION APPARATUS

(71) Applicant: ASAHI KASEI MICRODEVICES CORPORATION, Tokyo (JP)

(72) Inventor: Arata Kasamatsu, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 0 days.

(21) Appl. No.: 14/672,962

(22) Filed: Mar. 30, 2015

(65) Prior Publication Data

US 2015/0229842 A1 Aug. 13, 2015

Related U.S. Application Data

(62) Division of application No. 14/375,892, filed as application No. PCT/JP2013/003466 on May 31, 2013.

(30) Foreign Application Priority Data

Jun. 7, 2012 (JP) .................................. 2012-130057
Sep. 11, 2012 (JP) .................................. 2012-199525

(51) Int. Cl.
*H04N 5/225* (2006.01)
*H04N 5/232* (2006.01)
(Continued)

(52) U.S. Cl.
CPC .......... *H04N 5/2253* (2013.01); *H04N 5/2254* (2013.01); *H04N 5/2257* (2013.01); *H04N 5/23287* (2013.01); *G02B 7/08* (2013.01); *G02B 27/646* (2013.01); *G03B 3/10* (2013.01);
(Continued)

(58) Field of Classification Search
None
See application file for complete search history.

(56) References Cited

U.S. PATENT DOCUMENTS

2005/0196160 A1  9/2005 Uenaka
2005/0264901 A1 12/2005 Honsho
(Continued)

FOREIGN PATENT DOCUMENTS

CN   102445744 A   5/2012
CN   102472944 A   5/2012
(Continued)

OTHER PUBLICATIONS

Supplementary European Search Report issued in European Application No. 13800343.9 on Dec. 22, 2015.
(Continued)

*Primary Examiner* — Justin P Misleh
(74) *Attorney, Agent, or Firm* — Morgan, Lewis & Bockius LLP

(57) ABSTRACT

A position detection apparatus includes an autofocus mechanism and an optical image stabilization mechanism by using a closed loop control, in which a magnet is commonly used as an autofocus magnet and an optical image stabilization magnet to achieve downsizing. The position detection apparatus includes the autofocus mechanism that moves a lens along an optical axis (Z axis) of the lens, and the optical image stabilization mechanism that moves the lens in a direction orthogonal to the optical axis. A permanent magnet is secured to the lens, and moves according to the movement of the lens. The amount of movement thereof is detected by position sensors. The permanent magnet for autofocus used in the autofocus mechanism and the permanent magnet for optical image stabilization used in the optical image stabilization mechanism is provided in the vicinity of the lens for common use.

16 Claims, 23 Drawing Sheets

(51) Int. Cl.
  *G02B 7/08* (2006.01)
  *G03B 3/10* (2006.01)
  *G02B 27/64* (2006.01)
  *G03B 5/00* (2006.01)

(52) U.S. Cl.
  CPC ......... *G03B5/00* (2013.01); *G03B 2205/0007* (2013.01); *G03B 2205/0053* (2013.01); *G03B 2217/005* (2013.01); *H04N 5/2251* (2013.01); *H04N 5/23258* (2013.01)

(56) References Cited

U.S. PATENT DOCUMENTS

| | | | |
|---|---|---|---|
| 2006/0098968 A1 | 5/2006 | Ito et al. | |
| 2006/0256209 A1 | 11/2006 | Yoshida et al. | |
| 2008/0297642 A1* | 12/2008 | Osaka | H04N 5/2254 348/335 |
| 2009/0252488 A1* | 10/2009 | Eromaki | G02B 7/102 396/529 |
| 2009/0303380 A1* | 12/2009 | Seo | H04N 5/2257 348/373 |
| 2010/0182490 A1* | 7/2010 | Seol | G02B 7/08 348/345 |
| 2011/0176046 A1* | 7/2011 | Hu | G02B 7/08 348/335 |
| 2011/0217029 A1* | 9/2011 | Wu | G03B 17/00 396/55 |
| 2011/0236008 A1 | 9/2011 | Kang et al. | |
| 2012/0092551 A1 | 4/2012 | Ohishi et al. | |
| 2012/0099201 A1* | 4/2012 | Chan | G02B 27/646 359/557 |
| 2012/0103064 A1 | 5/2012 | McCauley et al. | |
| 2012/0154614 A1* | 6/2012 | Moriya | G03B 3/10 348/208.5 |
| 2012/0229926 A1* | 9/2012 | Wade | G02B 7/08 359/824 |

FOREIGN PATENT DOCUMENTS

| | | |
|---|---|---|
| JP | 2001-201777 A | 7/2001 |
| JP | 2006-011384 A | 1/2006 |
| JP | 2009-258760 A | 11/2009 |
| JP | 2010-085494 A | 4/2010 |
| JP | 2010-231043 A | 10/2010 |
| JP | WO 2011021559 A1 * | 2/2011 ............ G03B 3/10 |
| JP | 2011-065140 A | 3/2011 |
| JP | 2011-069892 A | 4/2011 |
| JP | 2011-85666 A | 4/2011 |
| JP | 2011-107470 A | 6/2011 |
| JP | 2011-113009 A | 6/2011 |
| JP | 2011-197626 A | 10/2011 |
| JP | 2012-003052 A | 1/2012 |
| JP | 2012-093358 A | 5/2012 |
| JP | 2012-093558 A | 5/2012 |
| KR | 10-2006-0116705 | 11/2006 |
| TW | I360017 B | 3/2012 |

OTHER PUBLICATIONS

International Search Report dated Sep. 10, 2013 for International application No. PCT/JP2013/003466.
International Preliminary Report on Patentability dated Dec. 9, 2014, for the corresponding International Application No. PCT/JP2013/003466.
Chinese Office Action issued in Chinese Patent Application No. 201380007618.4 issued in Apr. 28, 2016.
Chinese Office Action issued in Chinese Patent Application No. 201380007618.4 issued on Apr. 25, 2016.

* cited by examiner

A AXIS VALUE = A   B AXIS VALUE = B

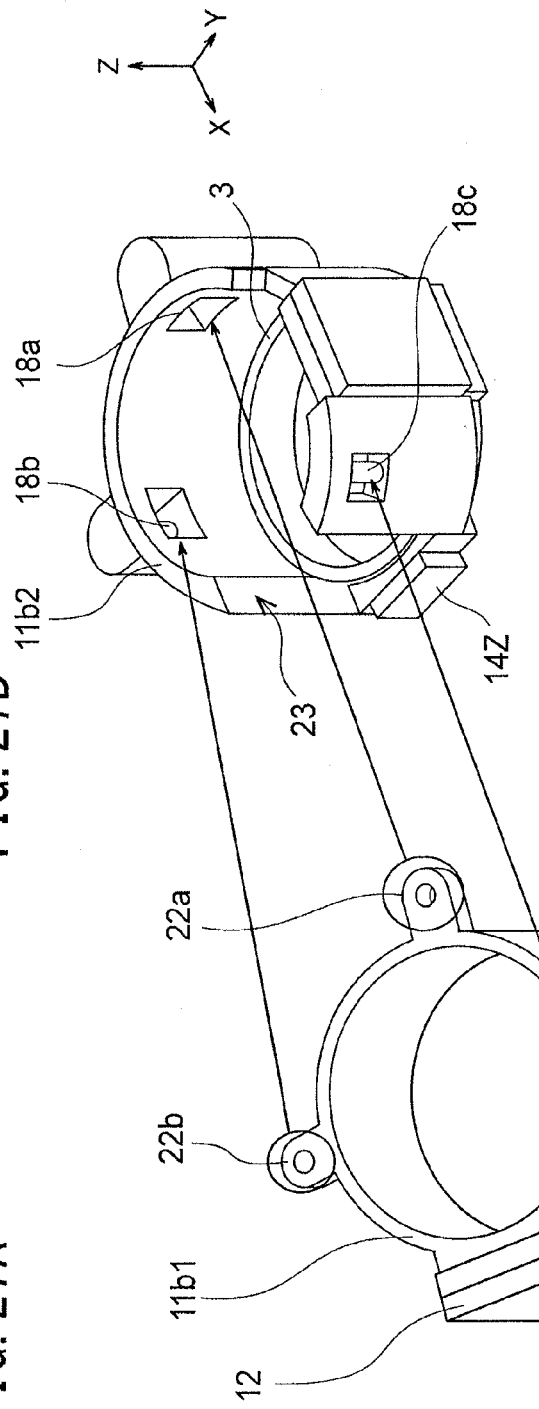
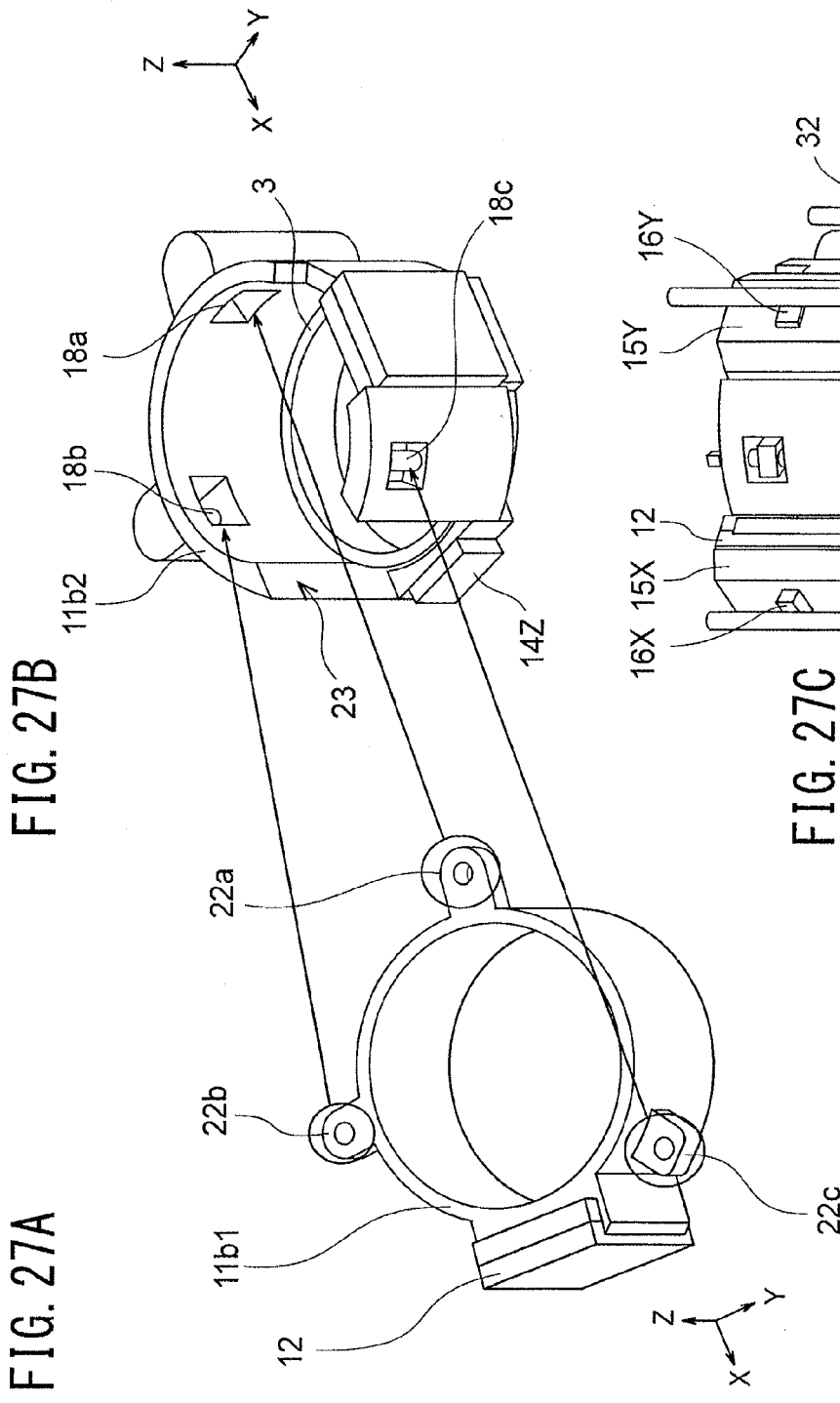
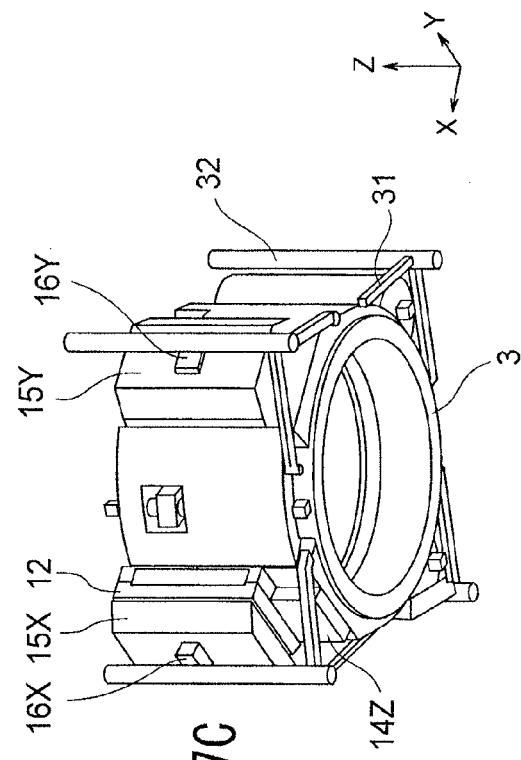

POSITION DETECTION APPARATUS

This application is a divisional of U.S. application Ser. No. 14/375,892, filed Jul. 31, 2014, which is a continuation of International Application No. PCT/JP2013/003466, filed May 31, 2013, which claims priority of Japanese Patent Application No. 2012-199525, filed Sep. 11, 2012 and Japanese Patent Application No. 2012-130057, filed Jun. 7, 2012, all of which are hereby incorporated by reference in their entirety.

TECHNICAL FIELD

The present invention relates to a position detection apparatus, and more specifically, to a position detection apparatus that includes a position sensor for autofocus (i.e., AF) that detects the position of a lens in an optical axis direction and a position sensor for optical image stabilizer (i.e., OIS) device that detects the position of the lens on a plane orthogonal to the optical axis direction, and a magnet for both AF and OIS, in which the magnet is commonly used for AF and OIS to achieve downsizing.

BACKGROUND ART

In recent years, there are more and more chances to capture a still image by using a small-sized camera for a mobile phone. Accordingly, even though image defocusing (i.e., vibration) occurs when capturing a still image, various optical image stabilizers or optical image stabilization (hereinafter, referred to as "OIS") capable of capturing clear still images and preventing the image from defocusing on an image forming surface have been proposed. As such an OIS method, an optical method such as a sensor shift method or a lens shift method, and a software method of performing OIS by image processing by using software are known.

In the sensor shift method, an imaging element (i.e., CCD or CMOS sensor) is movably configured centering around a reference position by using an actuator. Further, in the lens shift method, a correction lens is configured to move for adjustment on a plane orthogonal to an optical axis. Further, in the software method, for example, a noise component is removed from a detection result of detection means, and specific information necessary for correction of image defocusing due to a hand shaking an imaging device from a detection signal in which the noise component is removed is calculated, so that a captured image is stationary in a state where the imaging device is stationary without the image defocusing. Further, there is also a proposal for an optical image stabilizer that corrects image defocusing by oscillating a lens module (or a camera module) that holds a lens and an imaging element.

For example, PTL 1 discloses an optical image stabilizer capable of correcting image defocusing generated when a still image is captured by a small-sized camera for a mobile phone in order to obtain an image without image defocusing, in which the optical image stabilizer is provided in an AF camera drive unit, and a permanent magnet is commonly used to reduce the number of components. As a result, the size (mainly, height) of the optical image stabilizer is made small (i.e., reduced). Further, in PTL 1, four hall elements that correspond to position detection means for detecting the position of the autofocus lens drive unit are arranged along respective sides of the lens module.

CITATION LIST

Patent Literature

PTL 1: JP 2011-65140 A

SUMMARY OF INVENTION

Technical Problem

However, in the above-mentioned software method, when compared with the optical method, the image quality is inferior. Further, since software processing is included, the image capturing time becomes long.

Furthermore, the above-mentioned technique disclosed in PTL 1 is same as the present invention in that autofocus mechanism and the OIS mechanism are provided and the permanent magnet is commonly used in the autofocus mechanism and OIS mechanism. However, since the autofocus mechanism in PTL 1 uses an open loop control, an electric current should continuously flow across a coil in order to secure the lens position, which causes an increase in power consumption. In addition, since damping of a spring occurs, it takes time to determine the lens position, and thus, it takes time for focus searching.

Further, nothing is described about a structure in which the magnet is commonly used in the autofocus mechanism and the OIS mechanism when a closed loop control is used in the autofocus mechanism.

The present invention has been made in view of the above problems, and an object of the present invention is to provide a position detection apparatus capable of performing a closed loop control for autofocus and OIS, and to achieve downsizing.

Solution to Problem

The present invention has been made in order to solve the above-mentioned problems, according to an aspect of the present invention, there is provided a position detection apparatus that detects a position of a lens on a plane orthogonal to an optical axis direction of the lens to detect a position for optical image stabilization, and detects a position of the lens in the optical axis direction to detect a position for autofocus, the position detection apparatus comprising: a magnet configured to move as the lens moves in the optical axis direction and in an in-plane direction orthogonal to the optical axis; a first position sensor for the autofocus configured to sense a magnetic field to be changed according to the movement of the magnet in the optical axis direction to detect the position of the lens in the optical axis direction; and a second position sensor for the optical image stabilization configured to sense a magnetic field to be changed according to the movement of the magnet in the plane orthogonal to the optical axis direction to detect the position of the lens on the plane orthogonal to the optical axis direction.

Advantageous Effects of Invention

According to the present invention, since the magnet commonly used in the first position sensor for autofocus and the second position sensor for optical image stabilization is capable of moving in the optical direction of the lens and in the in-plane direction orthogonal to the optical axis of the lens, it is possible to perform the closed loop control at the time of autofocus and optical image stabilization, and to realize a small-sized position detection apparatus. Thus, it is possible to achieve downsizing, to reduce the time to focus compared with the open loop control, and to reduce power consumption.

BRIEF DESCRIPTION OF DRAWINGS

FIG. 26A and FIG. 26B are perspective views illustrating the position detection apparatus in Embodiment 4 of the present invention, in which FIG. 26A is a perspective view when viewed from the top, and FIG. 26B is a perspective view when viewed from the bottom; and FIG. 27A to FIG. 27C are assembly diagrams of the position detection apparatus illustrated in FIG. 26A and FIG. 26B, in which FIG. 27A is a perspective view of the first driver, FIG. 27B is a perspective view of the second driver, and FIG. 27C is a diagram illustrating a state where the first driver is combined with the second driver.

DESCRIPTION OF EMBODIMENTS

Embodiments of the present invention will be now described with reference to the drawings.

Embodiment 1

Figure 1:
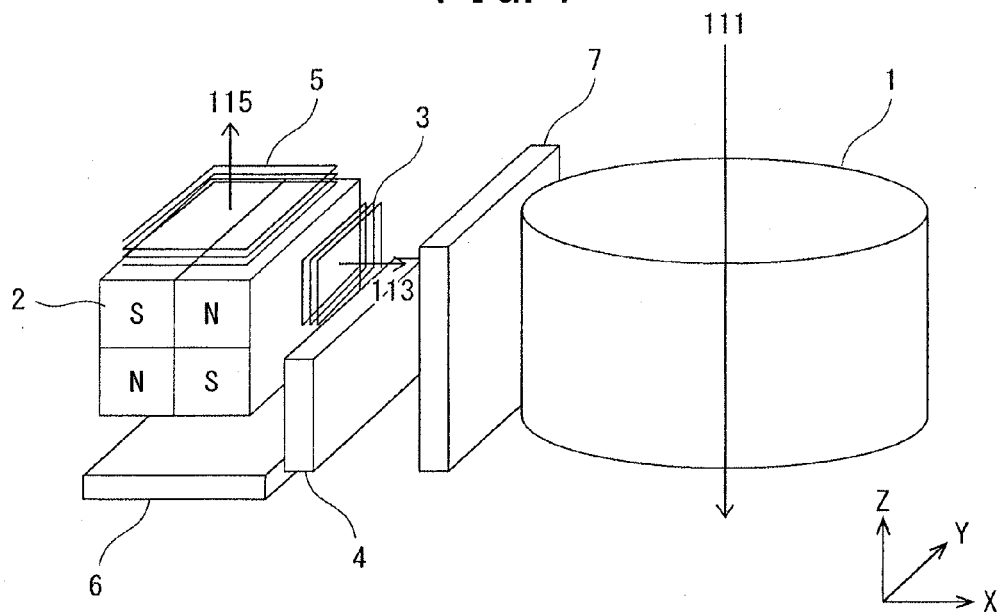
FIG. 1 is a diagram illustrating an example illustrating a position detection apparatus in Embodiment 1 of the present invention.

FIG. 1 is a diagram illustrating an example illustrating a position detection apparatus in Embodiment 1 of the present invention. In the drawing, reference numeral 1 represents a lens, reference numeral 2 represents a permanent magnet (i.e., X axis magnet for both OIS and AF), reference numeral 3 represents an autofocus (i.e., AF) coil, reference numeral 4 represents an AF position sensor (i.e., hall element), reference numeral 5 represents an X axis OIS coil, reference numeral 6 represents an X axis OIS position sensor (i.e., hall element), reference numeral 111 represents an optical axis of a lens, reference numeral 113 represents an axial direction of the AF coil, and reference numeral 115 represents an axial direction of the X axis OIS coil.

The position detection apparatus, in some embodiments of the present invention, detects the position of the lens 1 on a plane orthogonal to the optical axis direction of the lens 1 to detect a position for optical image stabilization, and detects the position of the lens 1 in the optical axis direction to detect a position for autofocus.

The permanent magnet 2 that is the X axis magnet for both OIS and AF moves as the lens 1 moves in the optical axis direction and in the in-plane direction orthogonal to the optical axis. Further, a first position sensor 4 is the AF position sensor (i.e., magnetic sensor) for autofocus that detects a magnetic field that is changed according to the movement of the permanent magnet 2 in the optical axis direction to detect the position of the lens 1 in the optical axis direction. Further, a second position sensor 6 is the X axis OIS position sensor (i.e., magnetic sensor) for OIS that detects a magnetic field that is changed according to the movement of the permanent magnet 2 in the in-plane direction orthogonal to the optical axis direction to detect the position of the lens 1 in the in-plane direction orthogonal to the optical axis direction.

That is, the position detection apparatus in Embodiment 1 is a position detection apparatus that includes an AF mechanism for moving the lens 1 along the optical axis (i.e., Z axis) of the lens 1, and an OIS mechanism for moving the lens in the direction orthogonal to the optical axis, in which the permanent magnet 2 is secured to the lens 1, the permanent magnet 2 moves according to the movement of the lens 1, and the amount of movement is detected by the position sensors 4 and 6.

The AF permanent magnet 2 used in the AF mechanism and the OIS permanent magnet 2 used in the OIS mechanism are provided in the vicinity of the lens 1 and commonly used. Namely, since the AF permanent magnet and the OIS permanent magnet used in the OIS mechanism are not separately provided, but are commonly used, for example, the drive coil, the hall element, and the permanent magnet contributing to the AF mechanism and the OIS mechanism can be accommodated at the size of 8.5 mm×8.5 mm, in one embodiment, and thus, and it is possible to realize a very small-sized position detection apparatus.

In Embodiment 1, the permanent magnet 2 includes two N-poles and two S-poles, in which the N-poles and the S-poles are aligned in a direction parallel to the optical axis, respectively, and are aligned in a direction orthogonal to the optical axis, respectively. However, the permanent magnet 2 may have one N-pole and one S-pole, or may have two or more N-poles and two or more S-poles.

Further, when a magnet having one N-pole and one S-pole is used as the permanent magnet 2, the N-pole and the S-pole may be aligned in the direction parallel to the optical axis, or may be aligned in the direction orthogonal to the optical axis.

In addition, when a magnet having two or more N-poles and two or more S-poles is used as the permanent magnet 2, the N-poles and the S-poles may be aligned in the direction parallel to the optical axis, respectively, or may be aligned in the direction orthogonal to the optical axis, respectively, or may be aligned in the direction parallel to the optical axis and in the direction orthogonal to the optical axis.

Moreover, the AF coil 3 is provided in the vicinity of the permanent magnet 2 so that the axial direction of the coil is orthogonal to the optical axis. Further, the AF position sensor (i.e., first position sensor) 4 detects the position of the lens 1 driven by the AF coil 3. In one embodiment, the AF position sensor 4 is a hall element. In Embodiment 1, both of the first position sensor and the second position sensor are hall elements, in which a normal direction of a magnetic sensitivity surface of the first position sensor (i.e., first hall element) is the direction orthogonal to the optical axis, and a normal direction of a magnetic sensitivity surface of the second position sensor (i.e., second hall element) is the direction parallel to the optical axis. Namely, the normal direction of the magnetic sensitivity surface of the first hall element and the normal direction of the magnetic sensitivity surface of the second hall element are different from each other. The normal direction of the magnetic sensitivity surface of the second position sensor (i.e., second hall element) may be a direction other than the normal direction of the magnetic sensitivity surface of the first position sensor (i.e., first hall element), and for example, may be the Y axis direction.

Furthermore, the first hall element may be arranged so that the normal direction of the magnetic sensitivity surface thereof is orthogonal to the optical axis direction, and the second hall element may be arranged so that the normal direction of the magnetic sensitivity surface thereof is parallel to or orthogonal to the optical axis direction, in which the normal direction of the magnetic sensitivity surface of the first hall element and the normal direction of the magnetic sensitivity surface of the second hall element may be arranged to be different from each other.

In addition, the axial direction of the AF coil 3 and the normal direction of the magnetic sensitivity surface of the first hall element may be the same direction, and the axial direction of the OIS coil 5 and the normal direction of the magnetic sensitivity surface of the second hall element may be the same direction.

In FIG. 1, the AF coil 3 and the AF hall element 4 are arranged on an identical plane at an intermediate position between the lens 1 and the permanent magnet 2, but the present invention is not limited to the above arrangement. For example, the AF coil 3 and the AF hall element 4 may be arranged at the rear of the permanent magnet 2 with respect to the lens 1, or may not even be on the identical plane.

With such a configuration, when an electric current flows across the AF coil 3, it is possible to adjust the position of the lens in the optical axis direction by mutual action of the magnetic field of the permanent magnet 2 and the magnetic field due to the electric current flowing across the AF coil 3.

Further, the OIS mechanism is a mechanism capable of correcting defocusing generated in capturing a still image by using a small-sized camera for a mobile phone in order to obtain an image without image defocusing, and is configured to perform the OIS by moving the lens in the X axis direction and the Y axis direction orthogonal to the optical axis.

The X axis OIS coil 5 is provided in the vicinity of the permanent magnet 2 so that the axial direction of the coil is the direction parallel to the optical axis. Further, the X axis OIS position sensor (i.e., second hall element) 6 detects the position of the lens 1 driven by the X axis OIS coil 5. In one embodiment, the X axis OIS position sensor 6 is a hall element. In FIG. 1, the X axis OIS coil 5 and the X axis OIS position sensor 6 are arranged in the direction orthogonal to the optical axis and in a direction parallel to the surfaces of the permanent magnet 2 with the permanent magnet 2 being interposed therebetween. However, any arrangement may be applicable as far as the movement in the X axis direction of the permanent magnet that is secured to the lens 1 is detectable.

In FIG. 1, only the OIS coil 5 and the OIS position sensor 6 for the X axis are illustrated, but a Y axis OIS coil and a Y axis OIS position sensor are also arranged on the Y axis. Namely, the OIS mechanism includes the permanent magnet 2, the OSI coil 5, and the OIS hall element 6 for the X axis, provided in the direction orthogonal to the optical axis of the lens 1, and further includes the permanent magnet 2, the OIS coil 5, and the OIS hall element 6 for the Y axis, provided in the direction orthogonal to the optical axis of the lens 1.

The hall element 6 arranged oppositely in the X axis direction detects a magnetic force of the permanent magnet 2 opposite to the hall element 6, so as to detect a first position based on the movement in the X axis direction. The hall element arranged oppositely in the Y axis direction detects a magnetic force of the permanent magnet opposite to the hall element, so as to detect a second position based on the movement in the Y axis direction.

The OIS coil 5 drives the lens in the X axis direction in cooperation with the permanent magnet 2. Further, a combination of the OIS coil 5 and the permanent magnet 2 functions as a voice coil motor (i.e., VCM).

With such a configuration, the OIS mechanism can move (i.e., swing) the lens so as to cancel a shaking of the housing of the mobile phone with a camera. Consequently, it is possible to perform the OIS.

Although the permanent magnet 2 is illustrated as a double-sided multipole magnet of a square shape, a double-sided monopole magnet of a square shape may be used instead. Further, a double-sided quadrupole magnet, a double-sided monopole magnet, or an outer peripheral multipole magnet of a cylindrical shape may be used. Furthermore, a single-sided monopole magnet, an inner peripheral monopole magnet or an outer peripheral monopole magnet of a ring shape may be used. In this way, various magnets to the permanent magnet 2 are applicable. Further, the permanent magnet 2 may be magnetized in the direction parallel to the optical axis.

In addition, a yoke 7 for forming a magnetic path of a magnetic flux from the permanent magnet 2 may be provided at an intermediate position between the lens 1 and the permanent magnet 2. The arrangement position of the yoke 7 may be at the rear of the permanent magnet with respect to the lens 1. When the yoke 7 is provided, the yoke 7 is secured to the lens 1 and the permanent magnet 2.

As the OIS mechanism in the lens driving method, the OIS coil 5, the OIS hall element 6, the AF coil 3, and the AF hall element 4 are secured, and the lens 1, the permanent magnet 2, and the yoke 7 are configured to move together. Further, as the AF mechanism, the AF coil 3 and the AF hall element 4 are secured, and the OIS coil 5 and the OIS hall element 6 in addition to the lens 1, the permanent magnet 2, and the yoke 7 are configured to move together. Namely, a lens module is configured by the lens 1, the permanent magnet 2, and the yoke 7, but the OIS coil 5 and the OIS hall element 6 are configured to move together at the time of AF.

Namely, by using a closed loop control in the AF mechanism and/or the OIS mechanism, the AF mechanism is subjected to a feedback control based on position information from the OIS hall element 6 of the OIS mechanism. Similarly, the OIS mechanism may be subjected to a feedback control based on position information from the AF hall element 4 of the AF mechanism. In other words, as the AF mechanism in the lens driving method, the AF coil 3, the AF hall element 4, the OIS coil 5, and the OIS hall element 6 are secured, and the lens 1, the permanent magnet 2, and the yoke 7 move together.

Further, as the OIS mechanism, the OIS coil 5, and the OIS hall element 6 are secured, and the AF coil 3 and the AF hall element 4 in addition to the lens 1, the permanent magnet 2, and the yoke 7 move together. Namely, the lens module is configured by the lens 1, the permanent magnet 2, and the yoke 7, but the AF coil 3 and the hall element 4 may be configured to move together at the time of OIS.

As described above, in some embodiments of the present invention, since the autofocus (AF) mechanism by using the closed loop control and the optical image stabilizer (OIS) mechanism are achieved by commonly using the AF permanent magnet, arranged in the direction orthogonal to the optical axis of the lens, used in the AF mechanism for the OIS permanent magnet used in the OIS mechanism, it is possible to realize a small-sized position detection apparatus.

Figure 2:
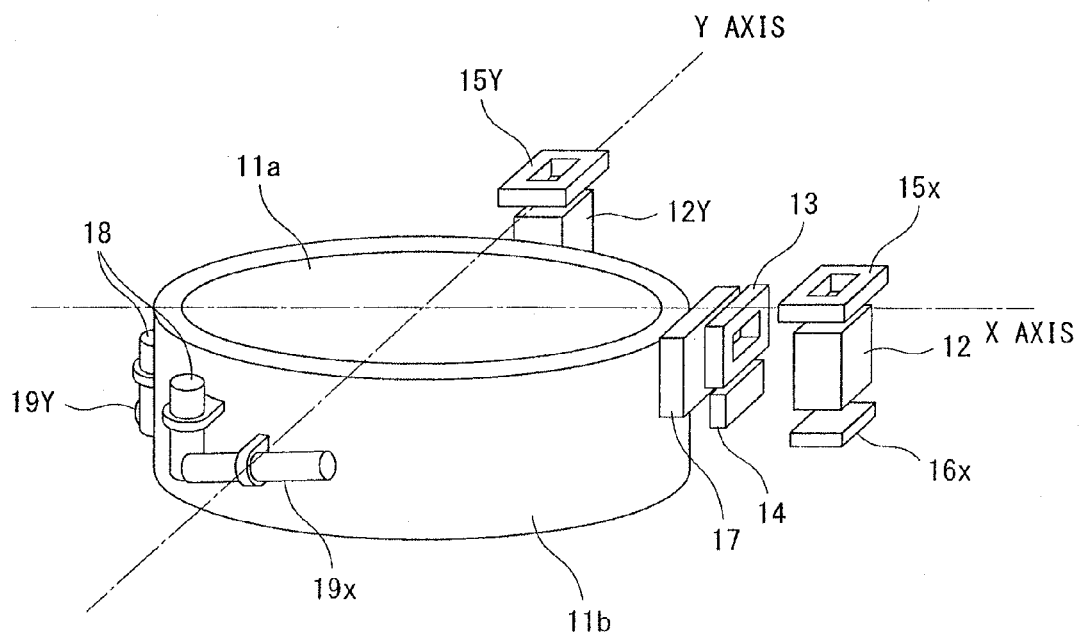
FIG. 2 is a specific perspective view illustrating the position detection apparatus in some embodiments of the present invention.
Figure 3:
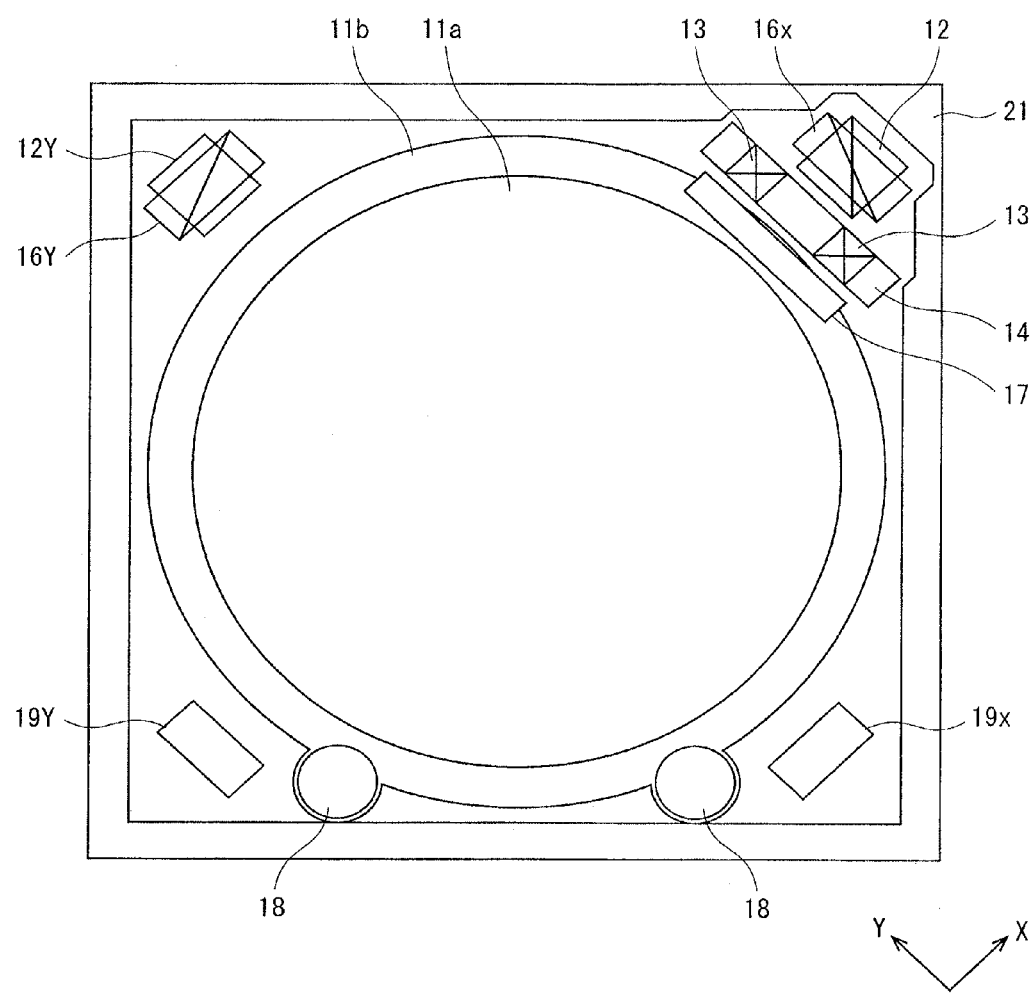
FIG. 3 is a top view of the position detection apparatus illustrated in FIG. 2.

FIG. 2 is a specific perspective view illustrating the position detection apparatus in some embodiments of the present invention. FIG. 3 is a top view of the position detection apparatus illustrated in FIG. 2. In the drawings, reference numeral 11a represents a lens, reference numeral 11b represents a driver (i.e., lens barrel), reference numeral 12 represents a permanent magnet (i.e., X axis magnet for both OIS and AF), reference numeral 12Y represents a Y axis OIS magnet, reference numeral 13 represents an AF coil, reference numeral 14 represents an AF hall element, reference numeral 15X represents an X axis OIS coil, reference numeral 15Y represents a Y axis OIS coil, reference numeral 16X represents an X axis OIS hall element, reference numeral 16Y represents a Y axis OIS hall element, reference numeral 17 represents a yoke, reference numeral 18 represents an AF driving shaft, and reference numeral 19 represents an X axis OIS driving shaft, reference numeral 19Y represents a Y axis OIS driving shaft, and reference numeral 21 represents a camera module.

The position detection apparatus in Embodiment 1 includes an OIS mechanism for optical image stabilization, and the OIS mechanism includes the X axis permanent magnet 12 provided in the vicinity of the lens 1, an OIS coil 15, and the position sensor 16X that detects the position of the lens 1. Additionally, the OIS mechanism includes the Y axis permanent magnet 12Y provided in the vicinity of the lens 1, the OIS coil 15Y, and the position sensor 16Y that detects the position of the lens 1. Further, the OIS mechanism includes the yoke 17 provided for forming the magnetic path of the magnetic flux from the permanent magnet 12.

Furthermore, the position detection apparatus in Embodiment 1 includes an AF mechanism for auto-focusing, so that a closed loop control is performed for the AF mechanism and/or the OIS mechanism and the AF mechanism is subjected to a feedback control based on position information from the second position sensor of the OIS mechanism.

Further, by using the closed loop control in the AF mechanism and/or the OIS mechanism, the OIS mechanism is subjected to a feedback control based on position information from the first position sensor of the AF mechanism.

The position detection apparatus illustrated in FIG. 2 and FIG. 3 includes the AF mechanism that moves along an optical axis (i.e., Z axis) of the lens 11a held by the driver (i.e., lens barrel) 11b, and the OIS mechanism that moves in a direction orthogonal to the optical axis. The permanent magnet 12 is secured to the lens 11a, and the permanent magnet 12 moves according to the movement of the lens 11a. Further, the amount of movement is detected by the AF hall element 14, the X axis OIS hall element 16X and the Y axis OIS hall element 16Y.

The AF permanent magnet used in the AF mechanism and the OIS permanent magnet used in the OIS mechanism are provided as the X axis magnet 12 for both OIS and AF in the direction orthogonal to the optical axis of the lens 11a to be commonly used.

Further, the position detection apparatus in some embodiments of the present invention includes the AF coil 13 provided in the vicinity of the permanent magnet 12, the first position sensor 14 that detects the position of the lens 11a driven by the AF coil 13, the OIS coils (i.e., 15X and 15Y) provided in the vicinity of the permanent magnet 12, and the second position sensor 16 that detects the position of the lens 11a driven by the OIS coil. In Embodiment 1, the axial direction of the AF coil 13 is referred to as a direction (i.e., X axis direction) orthogonal to the optical axis, and the axial direction of the OIS coils 15X and 15Y is referred to as a direction parallel to the optical direction.

Namely, the X axis OIS coil 15X is provided so that the axial direction of the OIS coil 15X is parallel to the optical axis direction, and the Y axis OIS coil 15Y is provided so that the axial direction of the OIS coil 15Y is parallel to the optical axis direction.

In this way, by making the axial direction of the AF coil and the axial direction of the OIS coil orthogonal to each other, it is possible to achieve downsizing, but the axial direction of the AF coil and the axial direction of the OIS coil are not necessarily orthogonal to each other.

Further, the AF hall element 14 detects the position of the lens 11a driven by the AF coil 13. In FIG. 2, the AF coil 13 and the AF hall element 14 are arranged on the identical plane at an intermediate position between the lens 11a and the permanent magnet 12, but the present invention is not limited to the arrangement. The AF coil 13 and the AF hall element 14 may be arranged at the rear of the permanent magnet 12 with respect to the lens 11a, or may not even be arranged on the identical plane.

With such a configuration, when an electric current flows across the AF coil 13, it is possible to adjust the position of the lens 11a in the optical axis direction along the AF driving shaft 18 by mutual action of the magnetic field of the permanent magnet 12 and the magnetic field due to the electric current flowing across the AF coil 13.

The X axis OIS coil 15X illustrated in FIG. 2 and FIG. 3 is provided in the vicinity of the permanent magnet 12 so that the axial direction of the coil is the direction parallel to the optical axis. Further, the X axis OIS hall element 16X detects the position of the lens 11a driven by the X axis OIS coil 15X. In FIG. 2 and FIG. 3, the X axis OIS coil 15X and the X axis OIS hall element 16X are arranged in a direction orthogonal to the optical axis and in a direction parallel to the surfaces of the permanent magnet 12 with the permanent magnet 12 being interposed therebetween. However, any arrangement may be applicable as far as the movement in the X axis direction of the permanent magnet that is secured to the lens 11a is detectable. Further, the Y axis OIS coil 15Y and the Y axis OIS hall element 16Y are also arranged on the Y axis.

The hall element 16X arranged oppositely in the X axis direction detects a magnetic force of the permanent magnet 12 opposite to the hall element 16X, so as to detect a first position based on the movement in the X axis direction. The hall element 16Y arranged oppositely in the Y axis direction detects a magnetic force of the permanent magnet 12Y opposite to the hall element 16Y, so as to detect a second position based on the movement in the Y axis direction.

The X axis OIS coil 15X and the Y axis OIS coil 15Y drive the lens 11a in the X axis direction along the X axis OIS driving shaft 19X, and in the Y axis direction along the Y axis OIS driving shaft 19Y, in cooperation with the permanent magnets 12 and 12Y. Further, a combination of the OIS coils 15X and 15Y and the permanent magnets 12 and 12Y functions as a voice coil motor (i.e., VCM).

Figure 4:
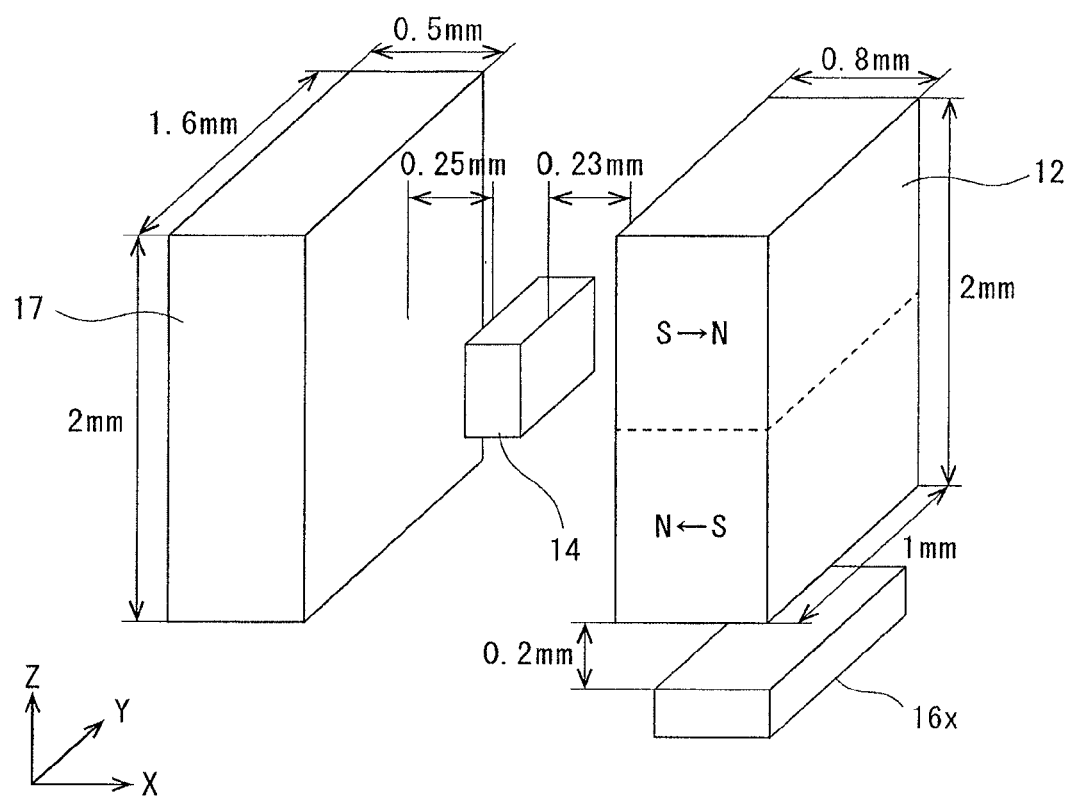
FIG. 4 is a diagram illustrating an arrangement relationship between a hall element and a permanent magnet in FIG. 2.

FIG. 4 is a diagram illustrating the arrangement relationship between the hall element and the permanent element illustrated in FIG. 2. As is apparent from FIG. 4, the AF hall element 14 is provided at an intermediate position of the X axis OIS and the AF magnet 12 is provided on the X axis in the vicinity of the lens and the yoke 17, and the X axis OIS hall element 16X is provided on the Z axis in the vicinity of the X axis magnet 12 for both OIS and AF. Further, in one embodiment, the yoke 17 and the magnet 12 move at the time of OIS (±0.1 mm on the X axis), and the yoke 17, the magnet 12, and the X axis OIS hall element 16X move at the time of AF (±0.15 mm on the Z axis).

In some embodiments, the Z-axial size of the X axis magnet 12 for both OIS and AF is 2 mm, the Y-axial size thereof is 1 mm, and the X-axial size thereof is 0.8 mm. The Z-axial size of the yoke 17 is 2 mm, the Y-axial size thereof is 1.6 mm, and the X-axial size thereof is 0.5 mm. Further, a gap between the X axis magnet 12 for both OIS and AF and the AF hall element 14 is 0.23 mm, a gap between the AF hall element 14 and the yoke 17 is 0.25 mm, and a gap between the X axis magnet 12 for both OIS and AF and the X axis OIS hall element 16X is 0.2 mm. Further, the material of the magnet is Nd—Fe—B, and the material of the yoke is SPCC steel (i.e., an iron plate according to JISG3141, which is a steel plate or a steel band manufactured by cold rolling).

Figure 5:
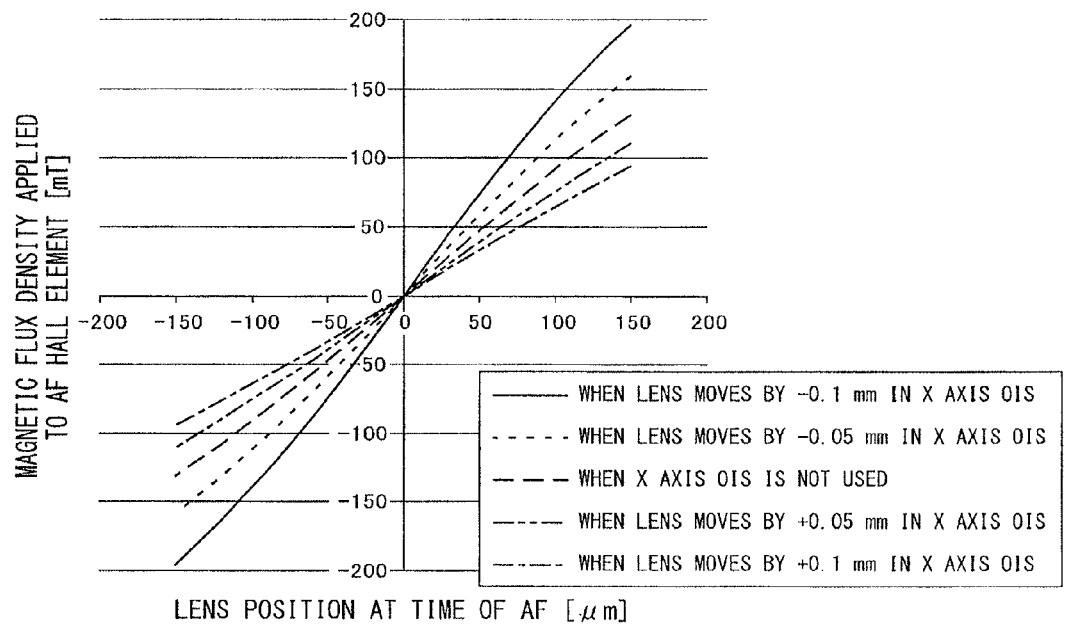
FIG. 5 is a diagram illustrating relationships between a lens position when an AF operation is performed under a simulation condition having the arrangement relationship between the hall element and the permanent magnet in FIG. 4, and a magnetic flux density applied to an AF hall element.

FIG. 5 is a diagram illustrating relationships between a lens position when the AF operation is performed under a simulation condition having the arrangement relationship between the hall element and the permanent magnet in FIG. 4, and a magnetic flux density applied to the AF hall element.

In the drawing, in one embodiment, sequentially from the right upper part, a solid line represents a case where the lens moves by −0.1 mm in X axis OIS, a dotted line represents a case where the lens moves by −0.05 mm in X axis OIS, a broken line represents a case where X axis OIS is not used, a two-dot chain line represents a case where the lens moves by +0.05 mm in X axis OIS, and a single-dot chain line represents a case where the lens moves by +0.1 mm in X axis OIS. In other words, the relationship between the lens position at the time of AF and the magnetic flux density applied to the AF hall element is formed so that the magnetic flux density applied to the AF hall element increases in a right upward direction as the lens position moves and the right upward slope becomes gentle from when the lens moves by −0.1 mm to when the lens moves by +0.1 mm in X axis OIS.

Figure 6:
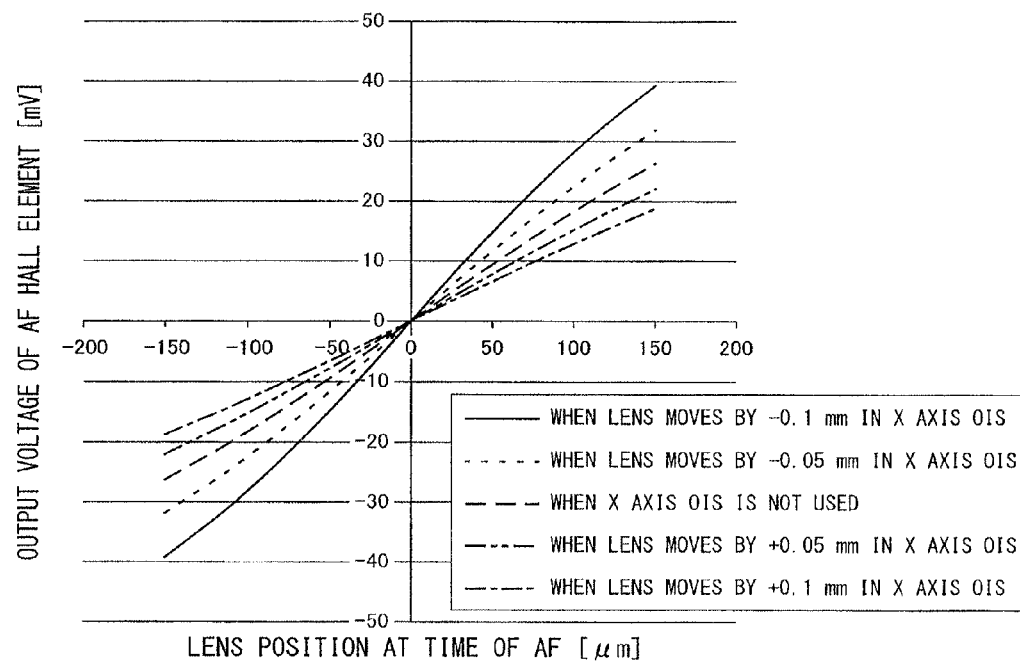
FIG. 6 is a diagram illustrating relationships between the lens position when the AF operation is performed under the simulation condition having the arrangement relationship between the hall element and the permanent magnet in FIG. 4, and an output voltage of the AF hall element.

FIG. 6 is a diagram illustrating relationships between the lens position when the AF operation is performed under the simulation condition having the arrangement relationship between the hall element and the permanent magnet in FIG. 4, and an output voltage of the AF hall element.

In the drawing, in one embodiment, sequentially from the right upper part, a solid line represents a case where the lens moves by −0.1 mm in X axis OIS, a dotted line represents a case where the lens moves by −0.05 mm in X axis OIS, a broken line represents a case where X axis OIS is not used, a two-dot chain line represents a case where the lens moves by +0.05 mm in X axis OIS, and a single-dot chain line represents a case where the lens moves by +0.1 mm in X axis OIS. In other words, the relationship between the lens position at the time of AF and the output voltage of the AF hall element is formed so that the output voltage of the AF hall element monotonically increases (or monotonically decreases) as the lens position moves and the slope of the monotonic increase (or monotonic decrease) becomes gentle from when the lens moves by −0.1 mm to when the lens moves by +0.1 mm in X axis OIS.

An example in which the sensitivity of the hall element is 0.2 mV/mT is illustrated, but a hall element having a different sensitivity may be used.

Figure 7:
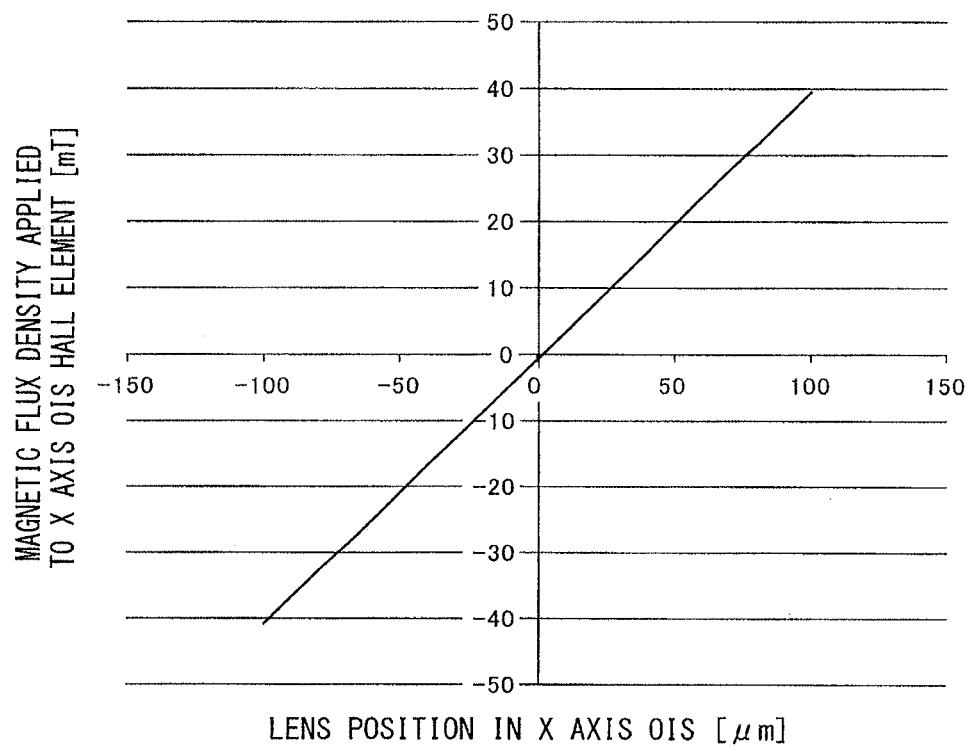
FIG. 7 is a diagram illustrating a relationship between a lens position when an X axis OIS operation is performed under the simulation condition having the arrangement relationship between the hall element and the permanent magnet in FIG. 4, and a magnetic flux density applied to an X axis OIS hall element.

FIG. 7 is a diagram illustrating a relationship between the lens position when the X axis OIS operation is performed under the simulation condition having the arrangement relationship between the hall element and the permanent magnet in FIG. 4, and a magnetic flux density applied to the X axis OIS hall element. In other words, the magnetic flux density applied to the X axis OIS hall element increases in a right upward direction as the lens position in X axis OIS moves.

Figure 8:
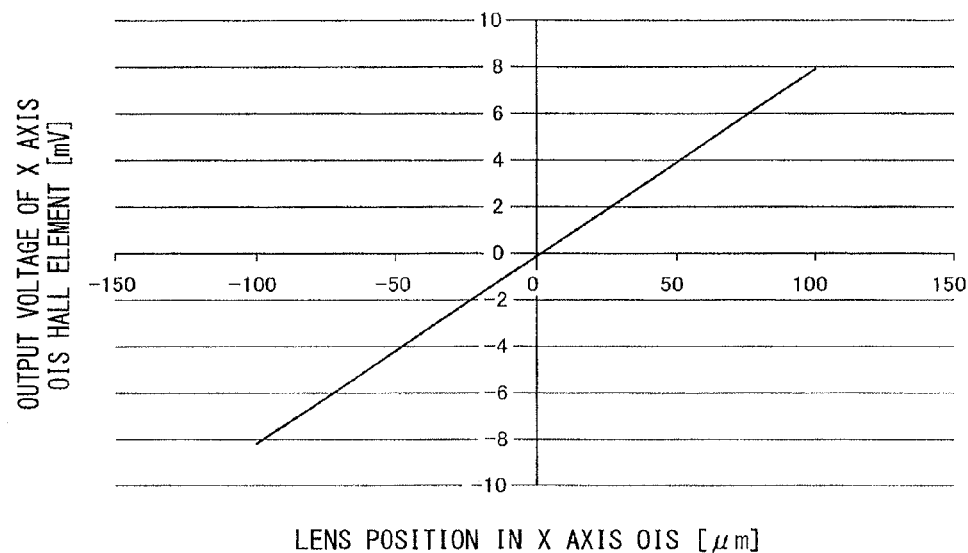
FIG. 8 is a diagram illustrating a relationship between the lens position when the X axis OIS operation is performed under the simulation condition having the arrangement relationship between the hall element and the permanent magnet in FIG. 4, and an output voltage of the X axis OIS hall element.

FIG. 8 is a diagram illustrating a relationship between the lens position when the X axis OIS operation is performed under the simulation condition having the arrangement relationship between the hall element and the permanent magnet in FIG. 4, and an output voltage of the X axis OIS hall element. In other words, the output voltage of the X axis OIS hall element monotonically increases (or monotonically decreases) as the lens position in X axis OIS moves.

Hereinafter, in one embodiment, the correction method based on the simulation results in FIG. 6 and FIG. 8 will be described.

1) (output voltage of AF hall element when AF is at an end point and when X axis OIS lens is 0 mm)÷(output voltage of AF hall element when AF is at end point and when X axis OIS lens is −100 mm)→about 0.67

2) (output voltage of AF hall element when AF is at end point and when X axis OIS lens is 0 mm)÷(output voltage of AF hall element when AF is at end point and when X axis OIS lens is +100 mm)→about 1.40

3) (value of 2)−value of 1))/OIS movement distance (200 μm) . . . calculation of correction amount per OIS of 1 μm→about 0.00365

4) value of 3)×(OIS lens position)+(value of 2)+value of 1))/value of 2))→Table 1

TABLE 1

Values based on positions of OIS magnet

| | Position of X axis OIS magnet | | | |
|---|---|---|---|---|
| | −100 | −50 | 50 | 100 |
| Value of corrected gain | 0.669512 | 0.852105 | 1.21729 | 1.399883 |

This becomes a correction gain.

Figure 9:
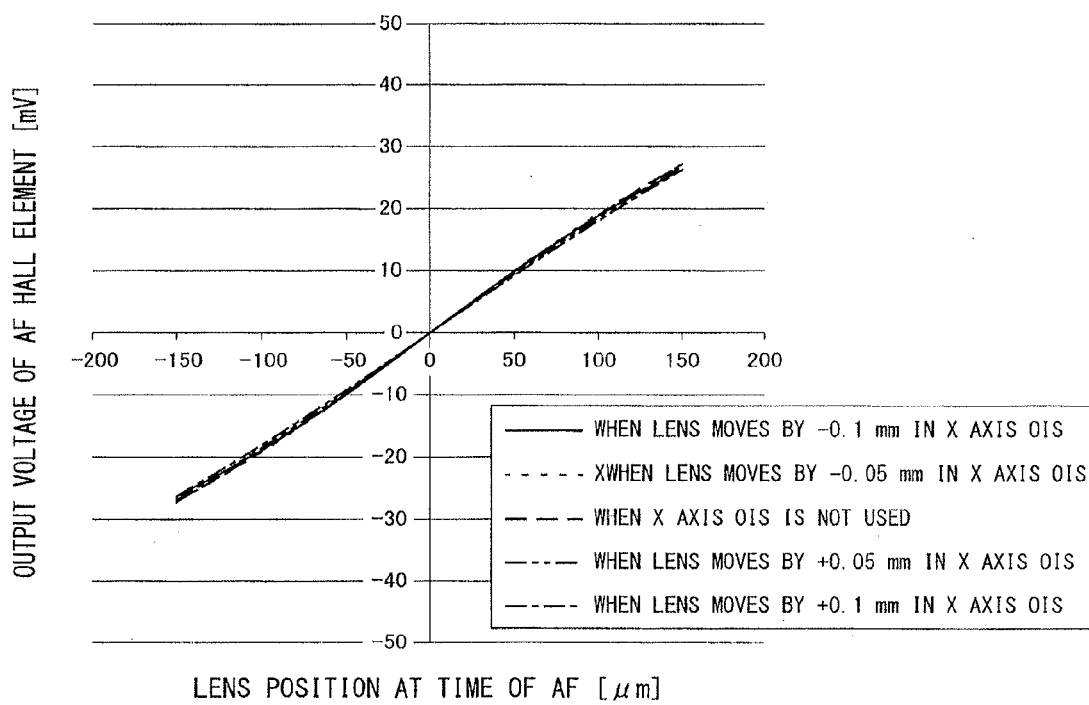
FIG. 9 is a diagram illustrating relationships between a lens position in the AF operation after a correction gain is introduced based on results of the simulations in FIG. 6 and FIG. 8 and an output voltage of the AF hall element.

FIG. 9 is a diagram illustrating relationships between the lens position at the time of AF after the correction gain is introduced based on results of the simulations in FIG. 6 and FIG. 8, and the output voltage of the AF hall element.

In the drawing, in one embodiment, sequentially from the right upper part, a solid line represents a case where the lens moves by −0.1 mm in X axis OIS, a dotted line represents a case where the lens moves by −0.05 mm in X axis OIS, a broken line represents a case where X axis OIS is not used, a two-dot chain line represents a case where the lens moves by +0.05 mm in X axis OIS, and a single-dot chain line represents a case where the lens moves by +0.1 mm in X axis OIS. In other words, it can be understood that the dispersion characteristic in FIG. 6 is improved after the correction gain is introduced.

In Embodiment 1, a method of feeding-back the output of the second position sensor (i.e., OIS sensor) to the AF mechanism is mainly described, but similarly, the output of the first position sensor (i.e., AF sensor) may be fed back to the OIS mechanism.

Embodiment 2

Figures 10A, 10B:
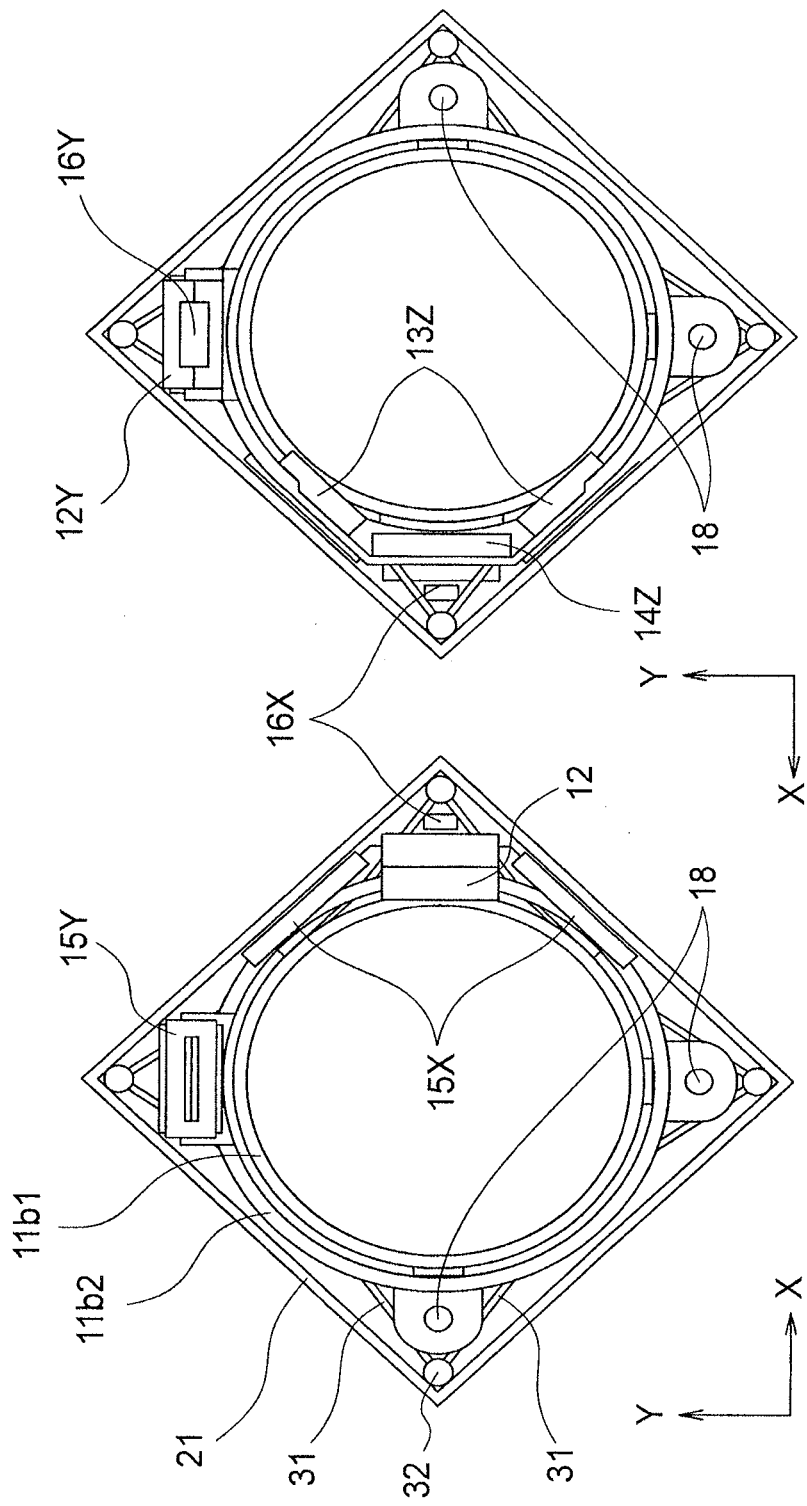
FIG. 10A and FIG. 10B are configuration diagrams illustrating the position detection apparatus in Embodiment 2 of the present invention.

FIG. 10A and FIG. 10B are configuration diagrams illustrating the position detection apparatus in Embodiment 2 of the present invention, in which FIG. 10A is a top view, and FIG. 10B is a bottom view. Reference numeral 31 represents an elastic member (or spring), and reference numeral 32 represents a support (i.e., power supply terminal). The same reference numerals are given to components having the same functions as in FIG. 2 and FIG. 3.

As illustrated in FIG. 10A and FIG. 10B, the position detection apparatus includes the driver 11b that holds the lens 11a, four supports 32 that are provided at four corners inside a housing 21 as power supply terminals for supplying a driving current, and two elastic members (or springs) 31 connected to the driver 11b and each of four supports 32 that are the power supply terminals. Further, the driver 11b includes a lens barrel (i.e., first driver) 11b1 and a second driver 11b2. Reference numeral 13Z represents a Z axis AF coil, and reference numeral 14Z represents a Z axis AF sensor (i.e., hall element). Further, the "housing" is defined as the outermost wall portion of the module.

In other words, the position detection apparatus includes the driver 11b that holds the lens 11a, four supports 32 that are provided in the housing 21 as the power supply terminals for supplying the driving current or for detecting a signal, and eight elastic members (or springs) 31 that are respectively connected to the driver 11b and four supports 32 that are the power supply terminals. Since the eight elastic members (or springs) 31 are respectively connected to the Z axis AF sensor 14Z provided in the vicinity of the permanent magnet 12 and the Z axis AF coils 13Z provided on both sides of the Z axis AF sensor 14Z, it is possible to input and output signals from the Z axis AF sensor 14Z and the Z axis AF coil 13Z through the eight elastic members (or springs) 31.

The entirety of the support may be a conductor, or only a part thereof connected to the elastic member (or spring) may be the conductor. Further, the support is capable of causing an electric current to flow between an external signal connection terminal secured to the housing and the spring. In general, a substrate (including a flexible board) is usually disposed between the support and the external connection terminal.

In this way, since the elastic member (or spring) 31 holds the position in the X axis and Y axis direction in a state of being connected to the lens operating section and the support with respect to the autofocus (AF) mechanism and the optical image stabilizer (OIS) mechanism, the lens operating section is configured to prevent from being broken due to abut with a neighboring wall.

Figure 11A:
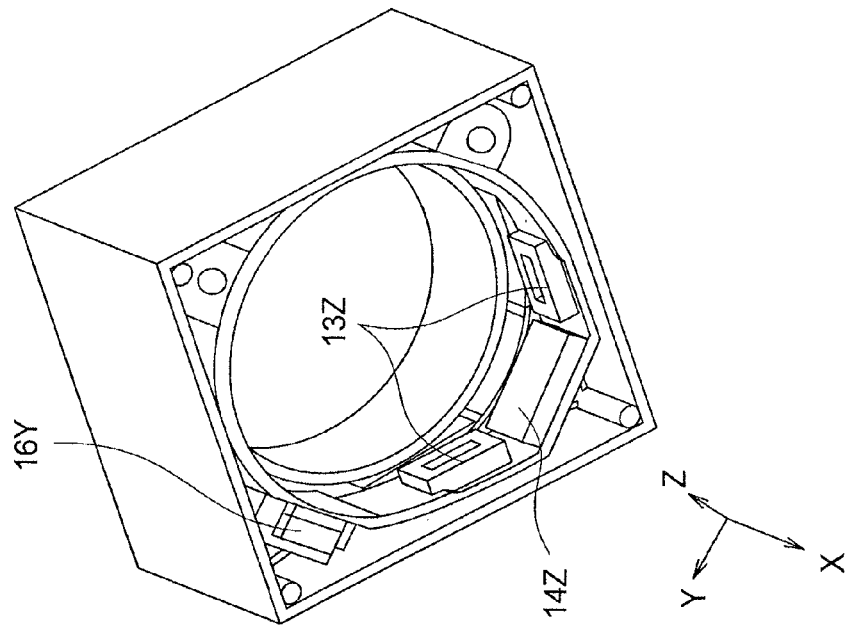
FIG. 11A and FIG. 11B are perspective views illustrating the position detection apparatus in Embodiment 2 of the present invention.
Figure 11B:
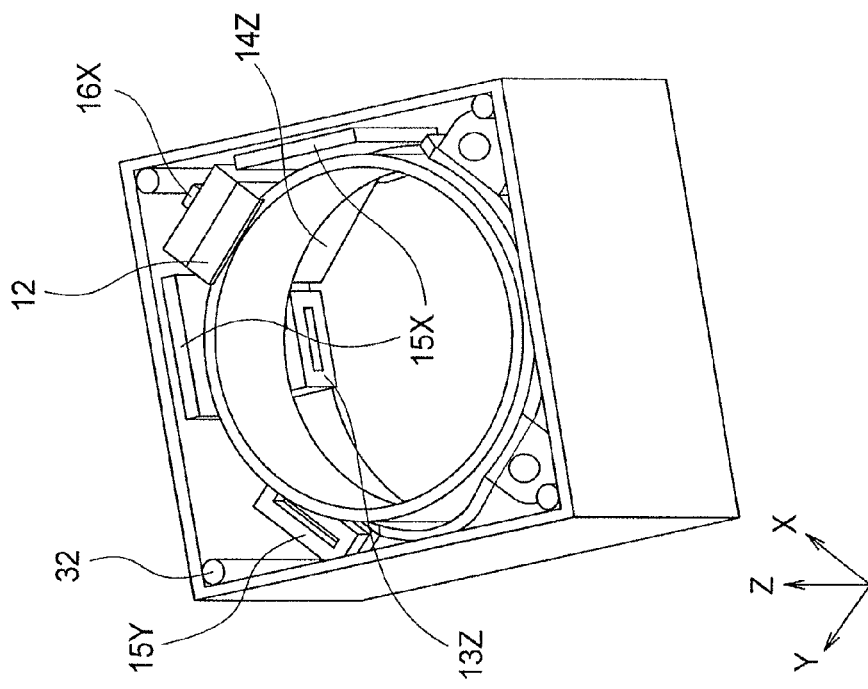

FIG. 11A and FIG. 11B are perspective views illustrating the position detection apparatus in Embodiment 2 of the present invention, in which FIG. 11A is a perspective view of the position detection apparatus illustrated in FIG. 10A when viewed from the top, and FIG. 11B is a perspective view of the position detection apparatus illustrated in FIG. 10A when viewed from the bottom.

As is apparent from FIG. 11A and FIG. 11B, the permanent magnet (i.e., X axis magnet for both OIS and AF) 12 is provided outside the lens barrel (i.e., first driver) 11b1, and the X axis OIS coils 15X are provided on both sides of the permanent magnet (i.e., X axis magnet for both OIS and AF) 12 outside the lens barrel (i.e., first driver) 11b1. Further, the X axis OIS hall element 16X is arranged at the rear of the permanent magnet (i.e., X axis magnet for both OIS and AF) 12.

Further, the Y axis OIS hall element 16Y is arranged outside the lens barrel (i.e., first driver) 11b1 in the direction orthogonal to the X axis OIS hall element 16X, and under the Y axis OIS magnet 12Y. Further, the Y axis OIS coil 15Y is arranged above the Y axis OIS magnet 12Y.

In addition, the Z axis AF sensor 14Z is arranged under the permanent magnet (i.e., X axis magnet for both OIS and AF) 12, and the Z axis AF coils 13Z are arranged on both sides of the Z axis AF sensor 14Z.

Figure 12A:
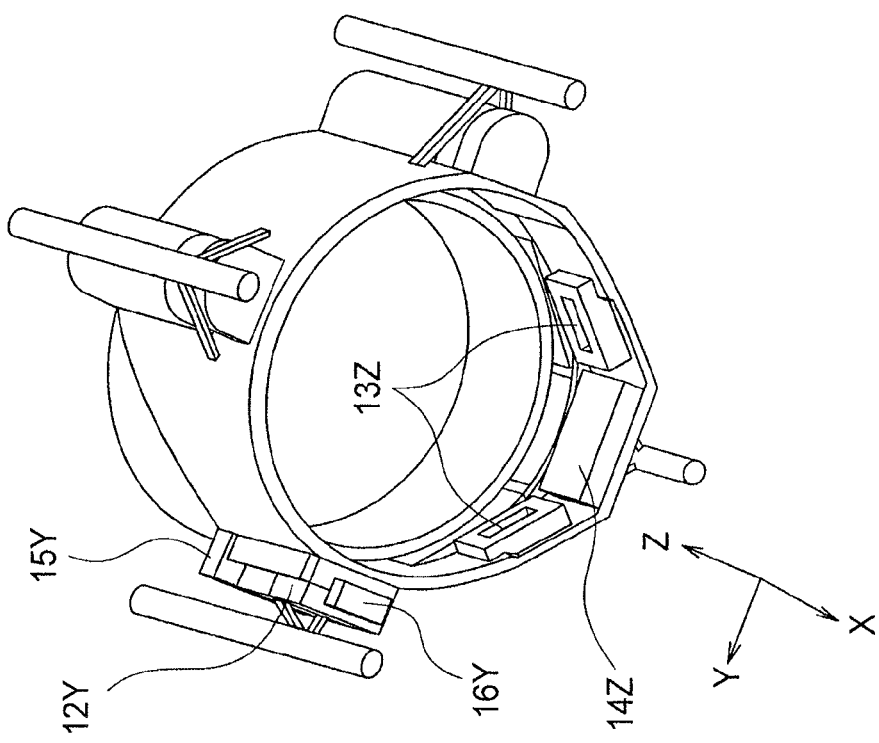
FIG. 12A and FIG. 12B are perspective views illustrating a state where a housing that is a frame is removed.
Figure 12B:
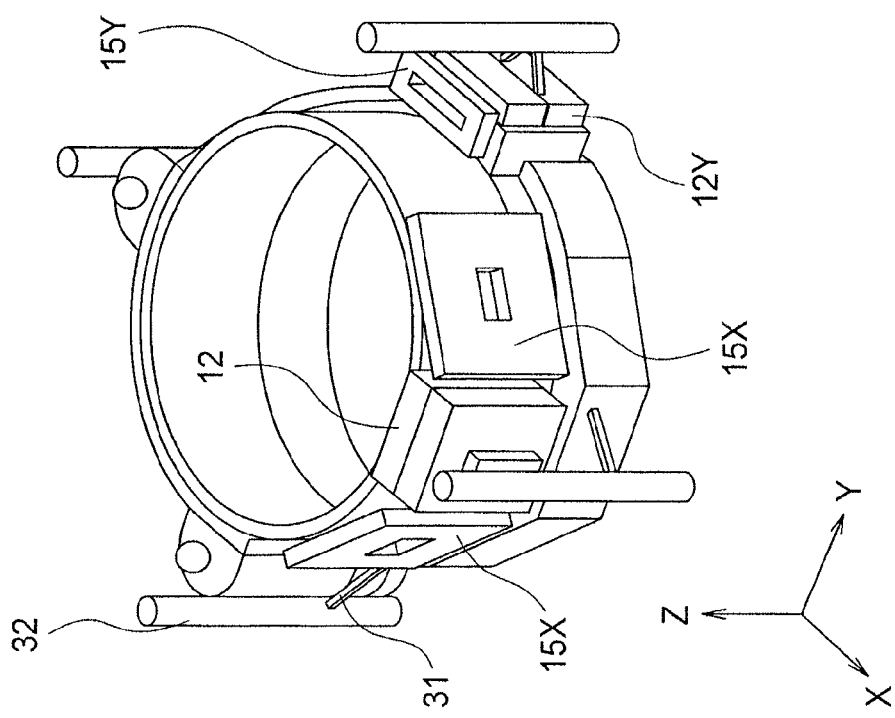

FIG. 12A and FIG. 12B are perspective views illustrating a state where the housing that is a frame is removed, in which FIG. 12A is a diagram corresponding to FIG. 11A, and FIG. 12B is a diagram corresponding to FIG. 11B.

As is apparent from FIG. 12A and FIG. 12B, the elastic member (or spring) 31 is connected to the power supply terminal (i.e., support) 32 for supplying the driving current, and to the Z axis AF sensor 14Z and the Z axis AF coils 13Z through the second driver 11b2.

Figure 13:
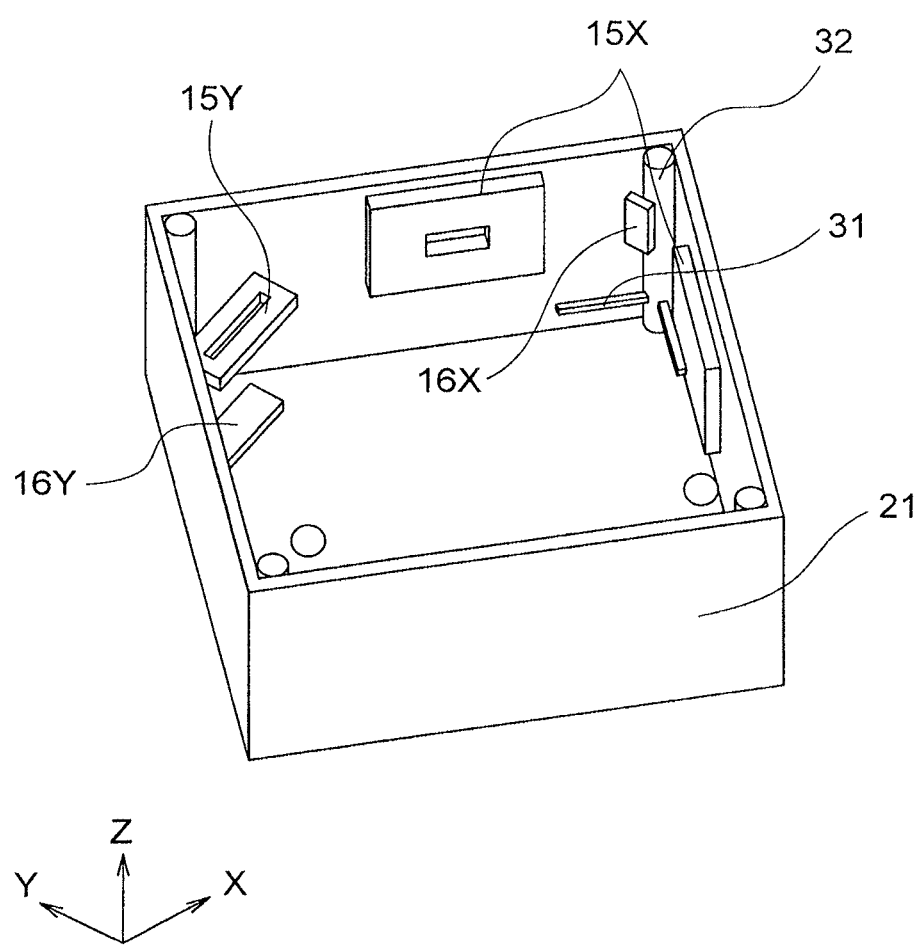
FIG. 13 is a perspective view illustrating the housing illustrated in FIG. 11A, and a member secured to the housing.

FIG. 13 is a perspective view illustrating the housing illustrated in FIG. 11A, and a member secured to the housing, in which the driver and the like are removed from FIG. 11A. Here, the positional relationship between the X axis OIS hall element coils 15X, the X axis OIS hall element 16X, the support 32, and the elastic members (or springs) 31 is easily recognized. Further, the X axis OIS hall element coils 15X, the X axis OIS hall element 16X, the support 32, and the elastic members 31 are arranged on the front surface of the support, and the X axis OIS coils 15X are arranged on both sides of the X axis OIS hall element 16X along the wall surface of the housing 21. The members illustrated in FIG. 13 are not mounted to the operating section, and are secured to the wall surface or the like of the outermost periphery.

Figure 14A:
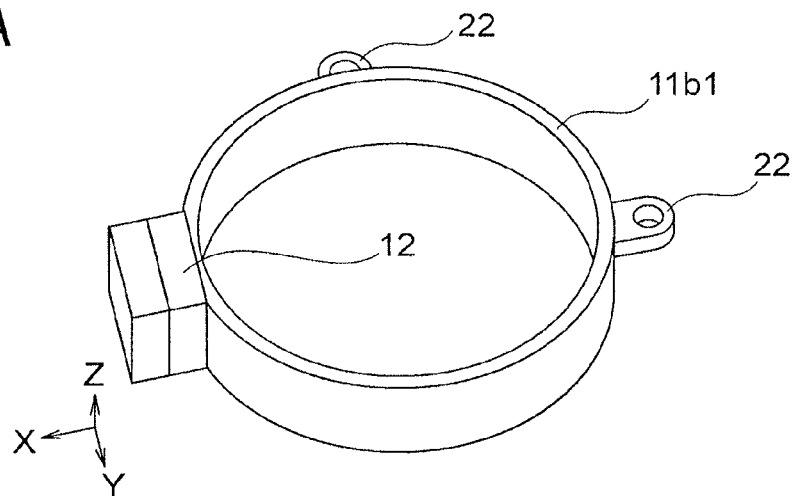
FIG. 14A to FIG. 14C are perspective views illustrating a lens barrel (i.e., first driver) and a second driver.
Figure 14B:
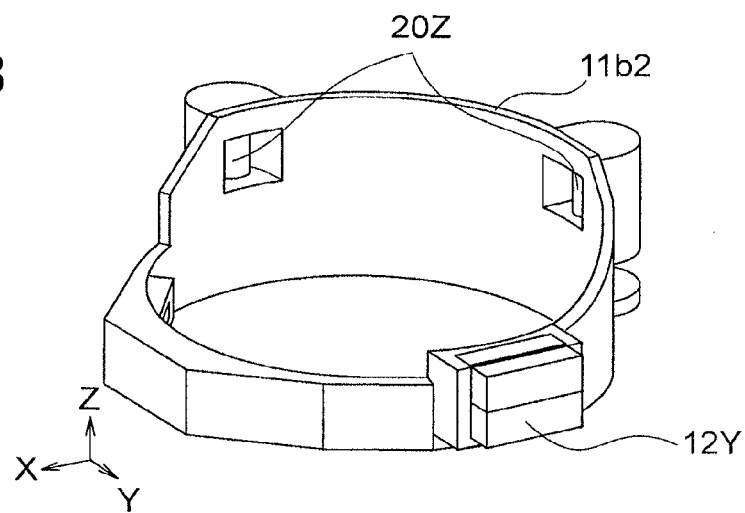
Figure 14C:
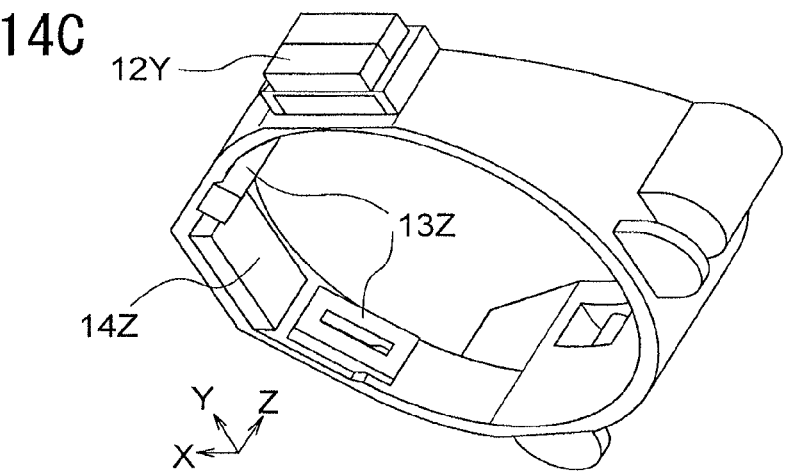

FIG. 14A to FIG. 14C are perspective views illustrating the lens barrel (i.e., first driver) and the second driver, in which FIG. 14A is a perspective view of the lens barrel (i.e., first driver), FIG. 14B is a perspective view of the second driver, and FIG. 14C is a perspective view of the second driver illustrated in FIG. 14B, when viewed from the bottom.

As is apparent from FIG. 14A to FIG. 14C, the permanent magnet (i.e., X axis magnet for both OIS and AF) 12 is attached to the lens barrel (i.e., first driver) 11b1, and the Y axis OIS magnet 12Y is attached to the outside of the second driver 11b2. Further, the Z axis AF sensor 14Z is arranged inside the second driver 11b2, and the Z axis AF coils 13Z are arranged on both sides of the Z axis AF sensor 14Z, along the inside of the second driver 11b2.

In addition, a Z axis direction driving rail 20Z illustrated in FIG. 14B is inserted into a hole in a projection portion of the lens barrel (i.e., first driver) 11b1 indicated by a circle in FIG. 14A, and the lens barrel (i.e., first driver) 11b1 moves in the Z axis direction. Further, only the permanent magnet (i.e., X axis magnet for both OIS and AF) 12 moves together with the lens barrel (i.e., first driver) 11b1. Furthermore, the Z axis AF coils 13Z, the Z axis AF sensor 14Z, and the Y axis OIS magnet 12Y move together with the second driver 11b2.

Figure 15A:
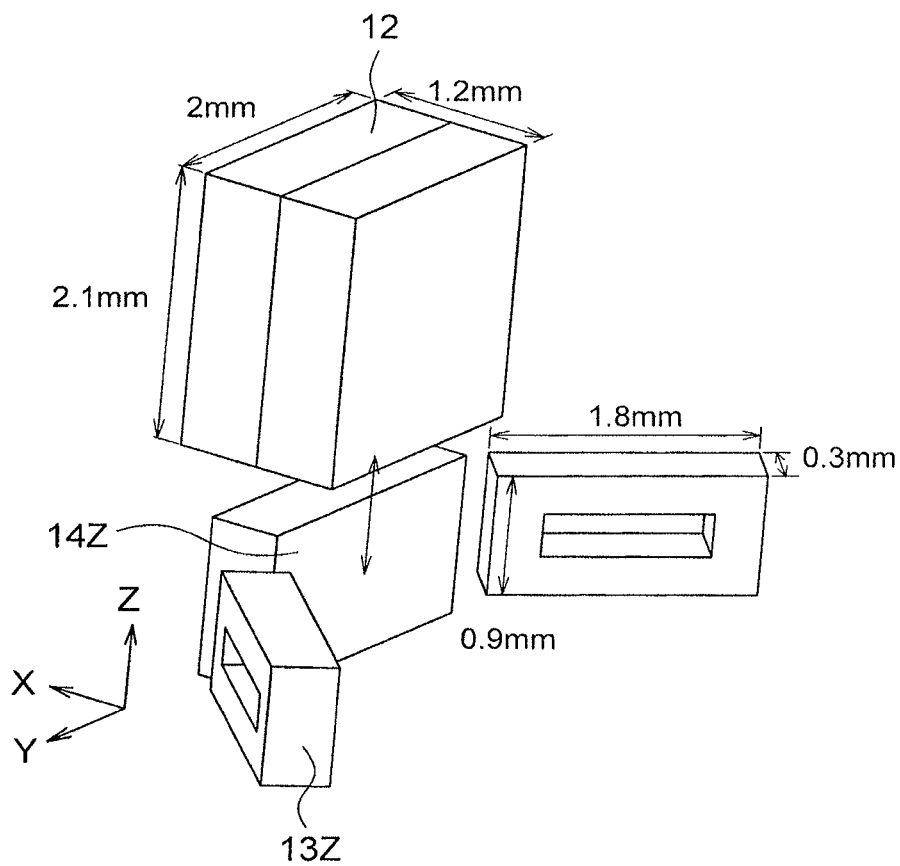
FIG. 15A and FIG. 15B are arrangement diagrams of a permanent magnet (i.e., Z axis AF magnet), a Z axis AF coil, and a Z axis AF sensor.
Figure 15B:
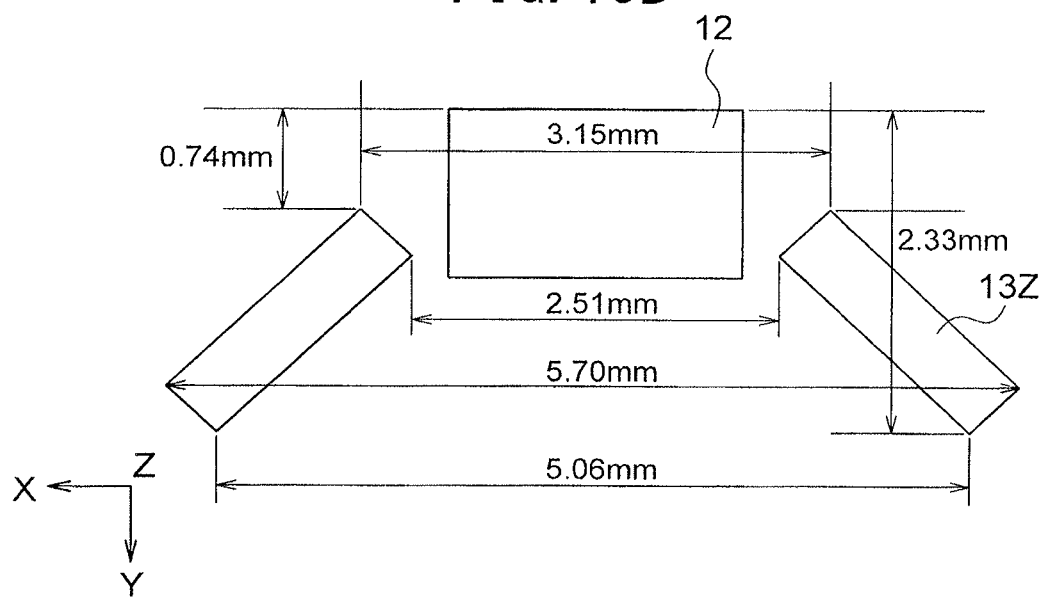

FIG. 15A and FIG. 15B are arrangement drawings of the permanent magnet (i.e., Z axis AF magnet), the Z axis AF coil, and the Z axis AF sensor, in which FIG. 15A is a diagram illustrating the size of each member, and FIG. 15B is a diagram illustrating interval sizes between the respective members.

The magnet moves in an arrow direction (i.e., Z axis direction) as an electric current flows across the Z axis AF coils 13Z. When the movement is made on a different axis, since the coil, the magnet, and the sensor all move on the X axis and the Y axis, there is no influence from the movement on a different axis.

In FIG. 15A, in one embodiment, the Z axis AF sensor 14Z is arranged under the permanent magnet (i.e., Z axis AF magnet) 12, and the Z axis AF coils 13Z are arranged on both sides of the Z axis AF sensor 14Z. The Z size of the permanent magnet (i.e., Z axis AF magnet) 12 is 2.1 mm, the Y size thereof is 2 mm, and the X size thereof is 1.2 mm. The thickness of the Z axis AF coil 13Z is 0.3 mm, the height thereof is 0.9 mm, and the width thereof is 1.8 mm. The Z size from the permanent magnet 12 to the center of the Z axis AF sensor 14Z is 1.02 mm. In the X and Y sizes, the center of the permanent magnet 12 and the center of the Z axis AF sensor 14Z are same. Further, the Z sizes of the center of the Z axis AF sensor 14Z and the center of the Z axis AF coil 13Z are same.

In FIG. 15B, in one embodiment, the shortest distance between the Z axis AF coils 13Z is 2.51 mm, the longest distance therebetween is 5.70 mm, a distance between lower ends thereof is 5.06 mm, and a distance between upper ends thereof is 3.15 mm. Further, a distance between the lower end of the Z axis AF coil 13Z and an upper end of the permanent magnet 12 is 2.33 mm, and a distance between the upper end of the Z axis AF coil 13Z and the upper end of the permanent magnet 12 is 0.74 mm.

Figure 16A:
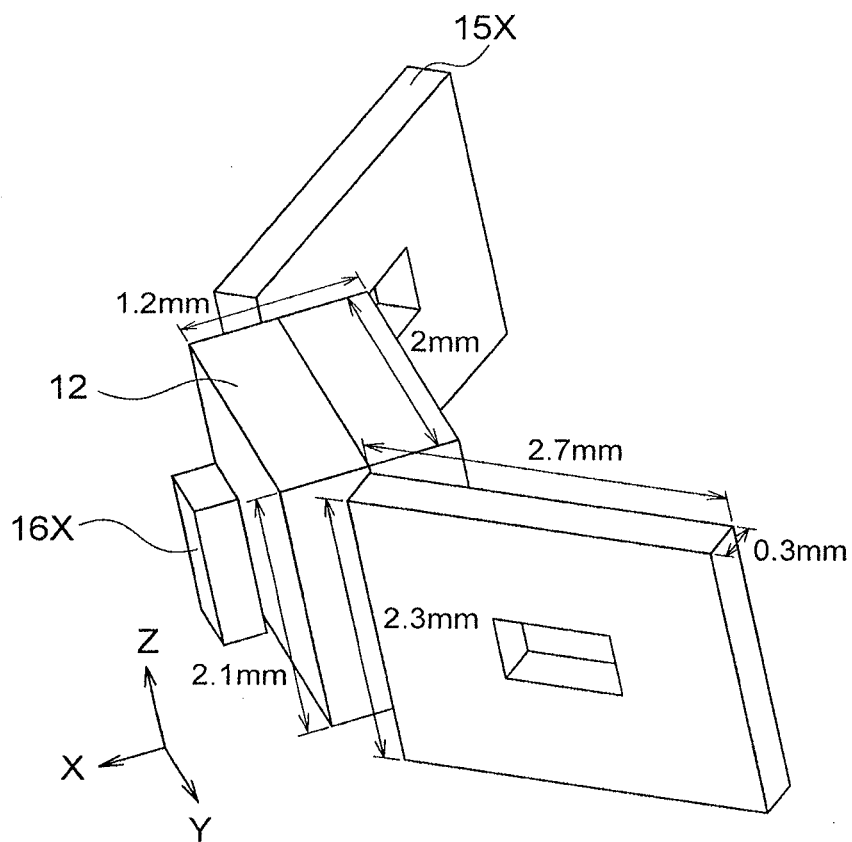
FIG. 16A and FIG. 16B are arrangement diagrams of a permanent magnet (i.e., X axis OIS magnet), an X axis OIS coil, and an X axis OIS sensor.
Figure 16B:
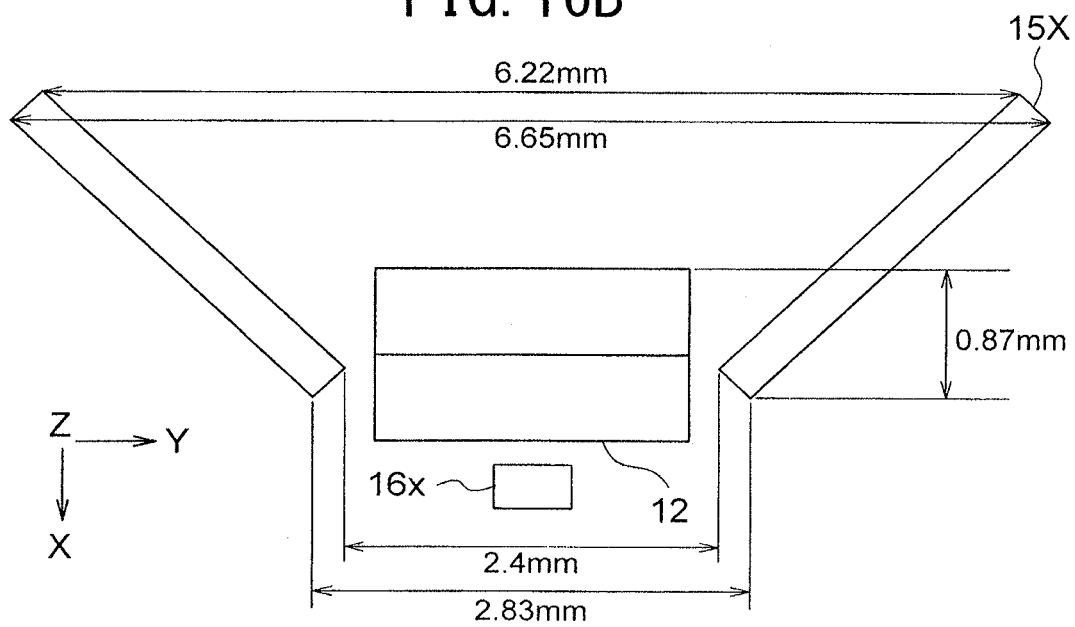

FIG. 16A and FIG. 16B are arrangement diagrams of the permanent magnet (i.e., X axis OIS magnet), the X axis OIS coil, and the X axis OIS sensor, in which FIG. 16A is a diagram illustrating the size or the like of each member, and FIG. 16B is a diagram illustrating interval sizes between the respective members.

The magnet moves in an arrow direction (i.e., X axis direction) as an electric current flows across the X axis OIS coil 15X. When the movement is made on a different axis, there is an influence from the movement on the Y axis and the Z axis. However, since a magnetic flux at the center of a relatively large magnet is received, even though the movement is made on the Y axis and the Z axis, the amount of change of the signal is small.

In FIG. 16A, the X axis OIS hall element 16X is arranged at the rear of the permanent magnet (i.e., X axis OIS magnet) 12, and the X axis OIS coils 15X are arranged on both ends of the X axis OIS hall element 16X.

In FIG. 16A, in one embodiment, the Z size of the permanent magnet (i.e., X axis OIS magnet) 12 is 2.1 mm, the Y size thereof is 2 mm, and the X size thereof is 1.2 mm. The thickness of the X axis OIS coil 15X is 0.3 mm, the height thereof is 2.3 mm, and the width thereof is 2.7 mm. The Z sizes of the center of the X axis OIS hall element 16X, the center of the X axis OIS coil 15X, and the center of the permanent magnet (i.e., X axis OIS magnet) 12 are same. Further, the X size from the permanent magnet 12 (i.e., X axis OIS magnet) to the center of the X axis OIS hall element 16X is 0.25 mm.

In FIG. 16B, in one embodiment, the shortest distance between the X axis OIS coils 15X is 2.4 mm, the longest distance therebetween is 6.65 mm, a distance between lower ends thereof is 2.83 mm, and a distance between upper ends thereof is 6.22 mm. Further, a distance between the lower end of the X axis OIS coil 15X and the upper end of the permanent magnet (i.e., X axis OIS magnet) 12 is 0.87 mm.

Figure 17:
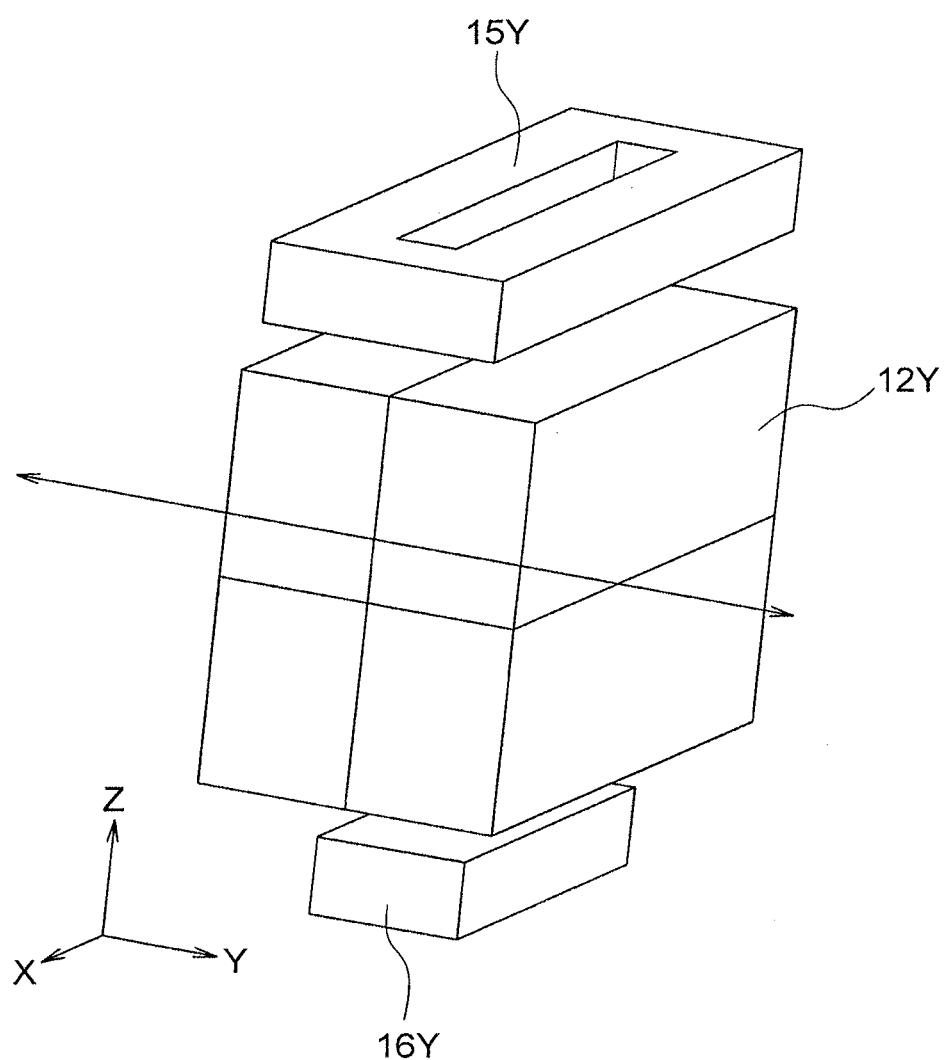
FIG. 17 is an arrangement diagram of a Y axis OIS magnet, a Y axis OIS coil, and a Y axis OIS sensor.

FIG. 17 is an arrangement diagram of the Y axis OIS magnet, the Y axis OIS coil, and the Y axis OIS sensor. The Y axis OIS coil 15Y is arranged above the Y axis OIS magnet 12Y, and the Y axis OIS hall element 16Y is arranged under the Y axis OIS magnet 12Y. The Y axis OIS magnet 12Y moves in an arrow direction (i.e., Y axis direction) as an electric current flows across the Y axis OIS coil 15Y. When the movement is made on a different axis, even though the movement is not made on the Z axis and is made on the X axis, the signals are hardly changed.

Figure 18B:
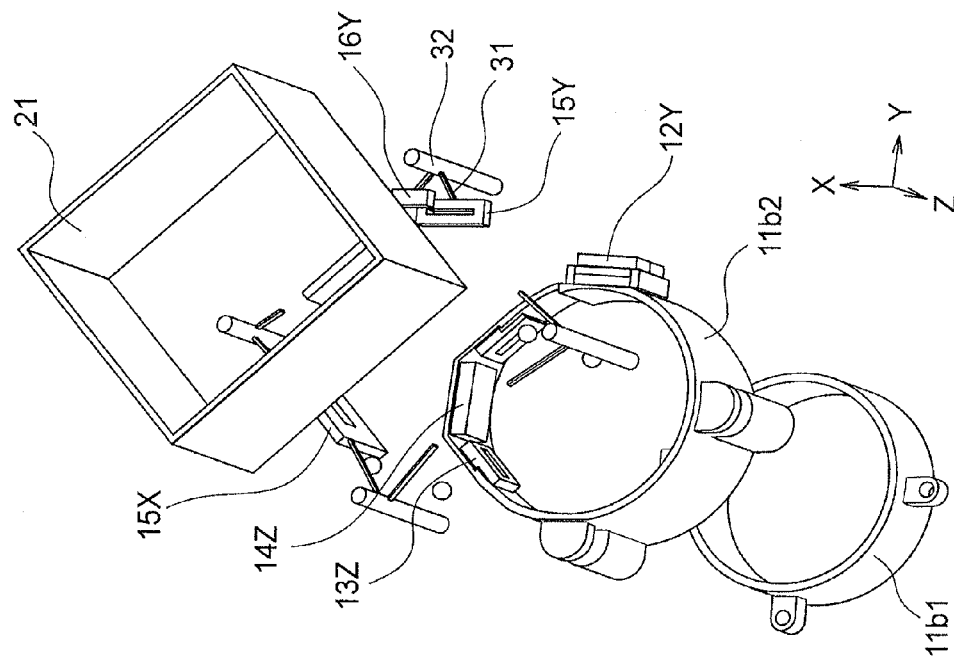
FIG. 18A and FIG. 18B are assembly diagrams of the lens barrel (i.e., first driver), the second driver, and the housing.
Figure 18A:
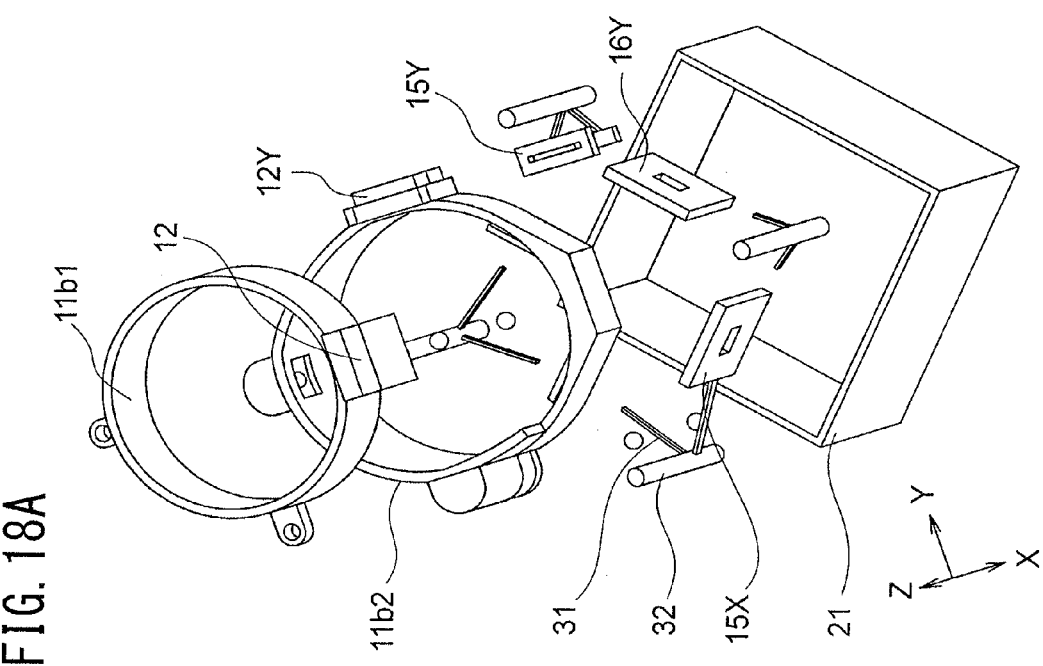

FIG. 18A and FIG. 18B are assembly diagrams of the lens barrel (i.e., first driver), the second driver, and the housing, in which FIG. 18A is a diagram when viewed from the lens barrel (i.e., first driver) side, and FIG. 18B is a diagram when viewed from the housing side.

In FIG. 18A, the permanent magnet (i.e., X axis magnet for both OIS and AF) 12 provided outside the lens barrel (i.e., first driver) 11b1 is illustrated, and in FIG. 18B, the Z axis AF sensor 14Z provided inside the second driver 11b2 and the Z axis AF coils 13Z arranged on both sides thereof are illustrated.

Figure 19A:
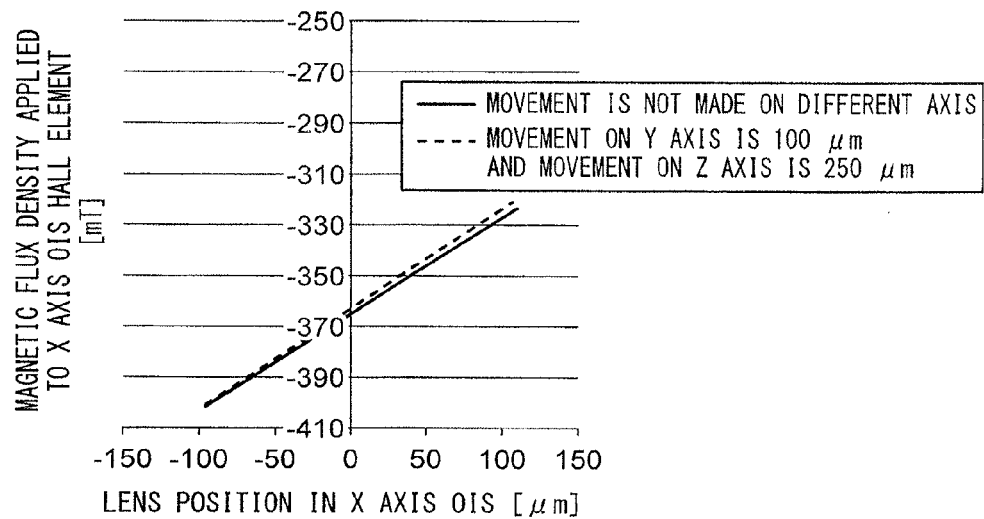
FIG. 19A and FIG. 19B are diagrams illustrating relationships between a magnetic flux density applied to the X axis OIS hall element and an output voltage of the hall element.
Figure 19B:
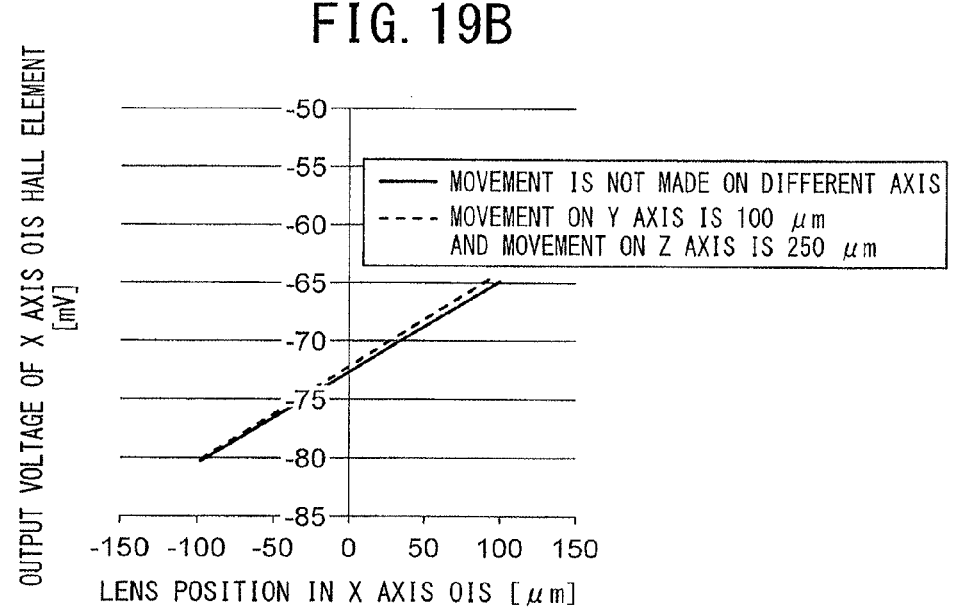

FIG. 19A and FIG. 19B are diagrams illustrating relationships between a magnetic flux density applied to the X axis OIS hall element and an output voltage of the hall element, in which FIG. 19A is a diagram illustrating relationships between the lens position when the X axis OIS operation is performed, and the magnetic flux density applied to the X axis OIS hall element, and FIG. 19B is a diagram illustrating relationships between the lens position when the X axis OIS operation is performed and the output voltage of the X axis OIS hall element. A solid line represents a case where the movement is not performed on a different axis, a broken line represents a case where the movement on the Y axis is 100 μm and the movement on the Z axis is 250 μm, in one embodiment.

Figure 20A:
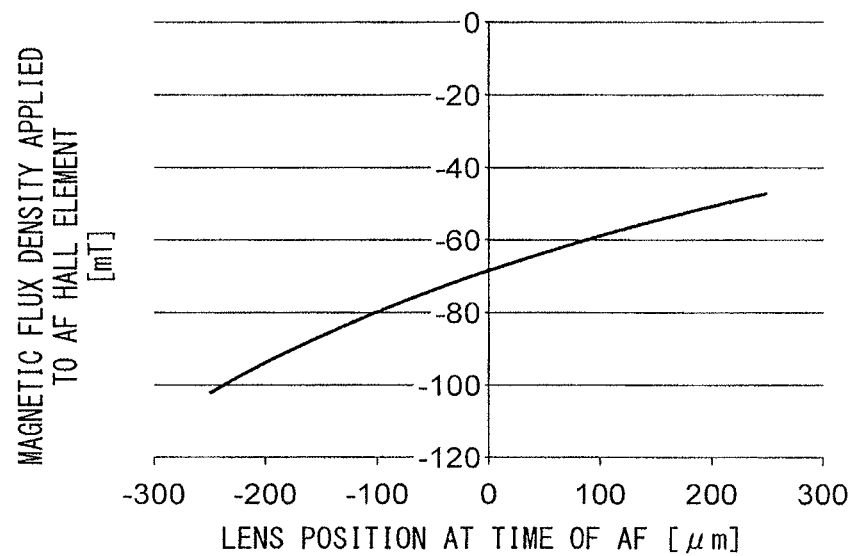
FIG. 20A and FIG. 20B are diagrams illustrating relationships between a magnetic flux density applied to a Z axis AF hall element and an output voltage of the hall element.
Figure 20B:
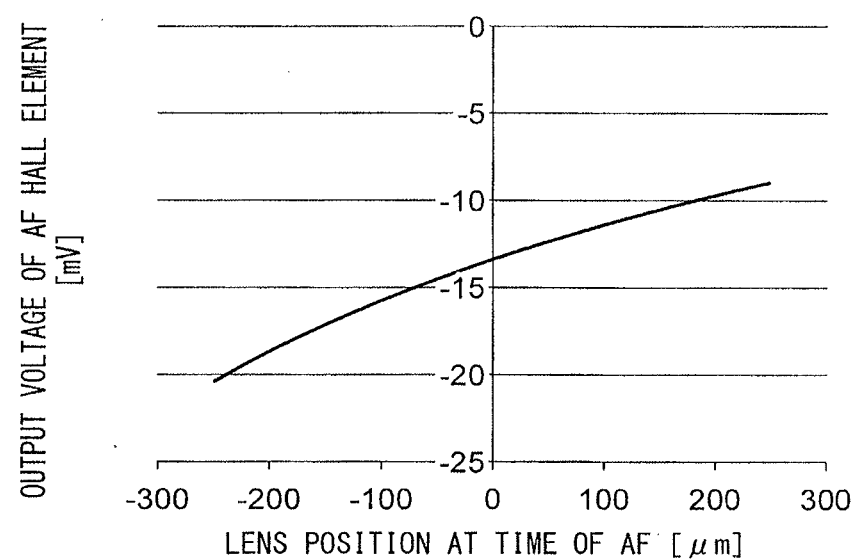

FIG. 20A and FIG. 20B are diagrams illustrating relationships between a magnetic flux density applied to the Z axis AF hall element, and an output voltage of the hall element, in which FIG. 20A is a diagram illustrating relationships between the lens position when the AF operation is performed, and the magnetic flux density applied to the AF hall element, and FIG. 20B is a diagram illustrating relationships between the lens position when the AF operation is performed, and the output voltage of the AF hall element.

Figure 21A:
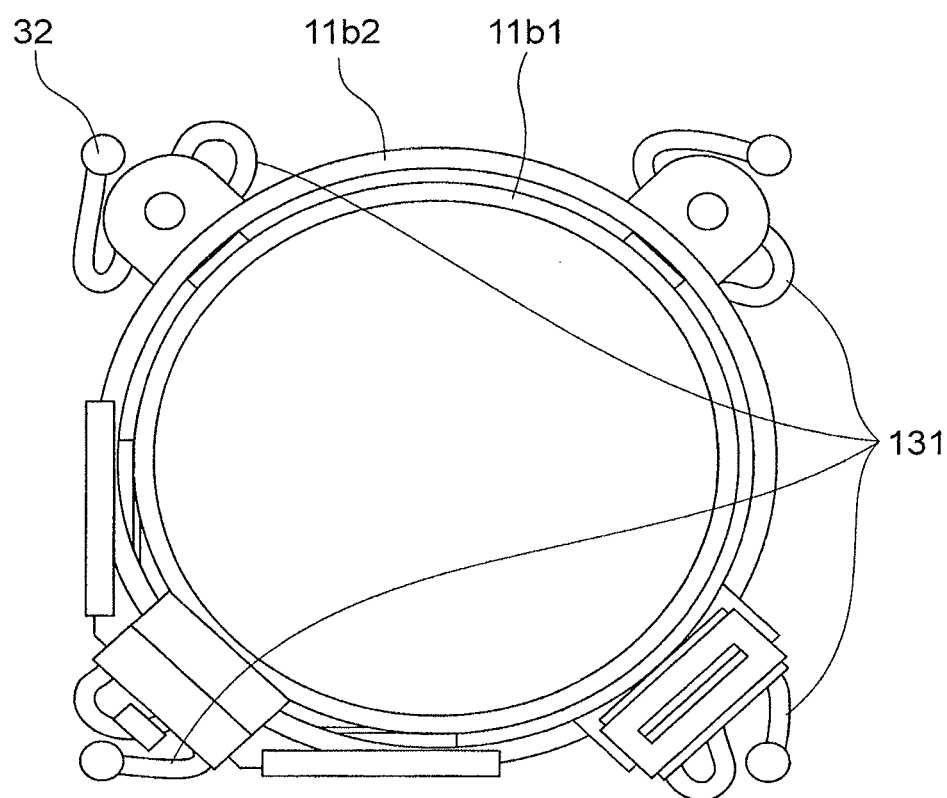
FIG. 21A and FIG. 21B are configuration diagrams illustrating another example of an elastic member the position detection apparatus in Embodiment 2 of the present invention illustrated in FIG. 10A.
Figure 21B:
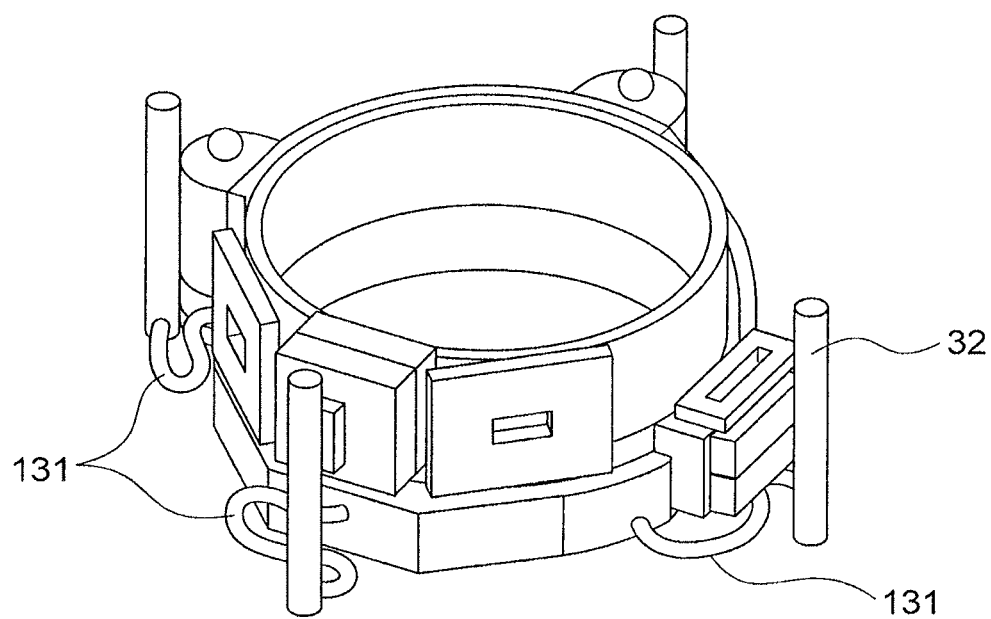

FIG. 21A and FIG. 21B are configuration diagrams illustrating another example of an elastic member of the position detection apparatus in Embodiment 2 of the present invention illustrated in FIG. 10A, in which FIG. 21A is a top view in a state where the housing is removed, and FIG. 21B is a perspective view in a state where the housing is removed. Reference numeral 131 represents a letter S-shaped spring. Further, the elastic member 131 may be an annular plate spring.

As described above, the position detection apparatus in Embodiment 2 uses the closed loop control in the AF mechanism and/or the OIS mechanism and includes the driver 11b that holds the lens 11a, the supports 32 that are provided in the housing 21, and the elastic members 31 that are connected to the Z axis AF sensor 14Z, the Z axis AF coil 13Z, and the supports 32 through the driver 11b.

In this way, in Embodiment 2, since the driving current or the signal supplied from the support (i.e., power supply terminal) is supplied to the coil or the sensor through the elastic members, and the signal output from the sensor is supplied to the support (i.e., power supply terminal) through the elastic members, it is possible to achieve downsizing. Further, since the elastic members hold the position in the X axis direction and the Y axis direction in a state of being connected to the lens operating section, it is possible to prevent the lens operating section from being broken due to abut with a neighboring wall.

In Embodiment 2, an example in which the elastic members 31 are connected to the Z axis AF sensor 14Z and the Z axis AF coil 13Z has been described mainly, but the elastic members 31 may be connected to at least one of the X axis OIS hall element 16X, the Y axis OIS hall element 16Y, the X axis OIS coil 15X, or the Y axis OIS coil 15Y.

The configuration in Embodiment 2 is applicable to a case where the optical image mechanism and the AF mechanism are not subjected to the feedback control.

Embodiment 3

Figure 22:
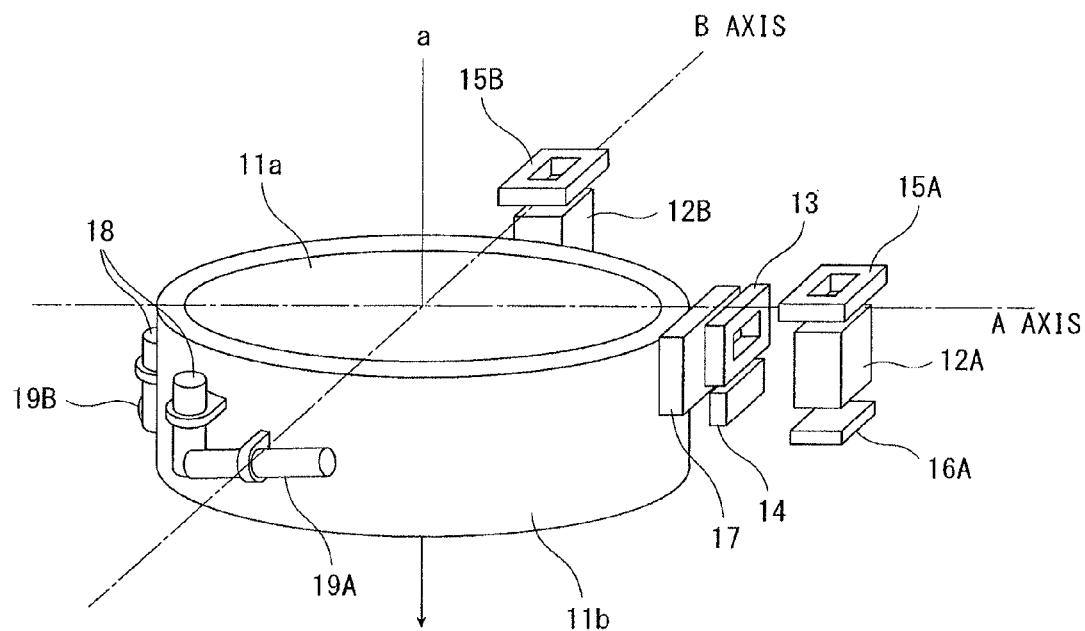
FIG. 22 is a perspective view illustrating the position detection apparatus in Embodiment 3 of the present invention.
Figure 23:
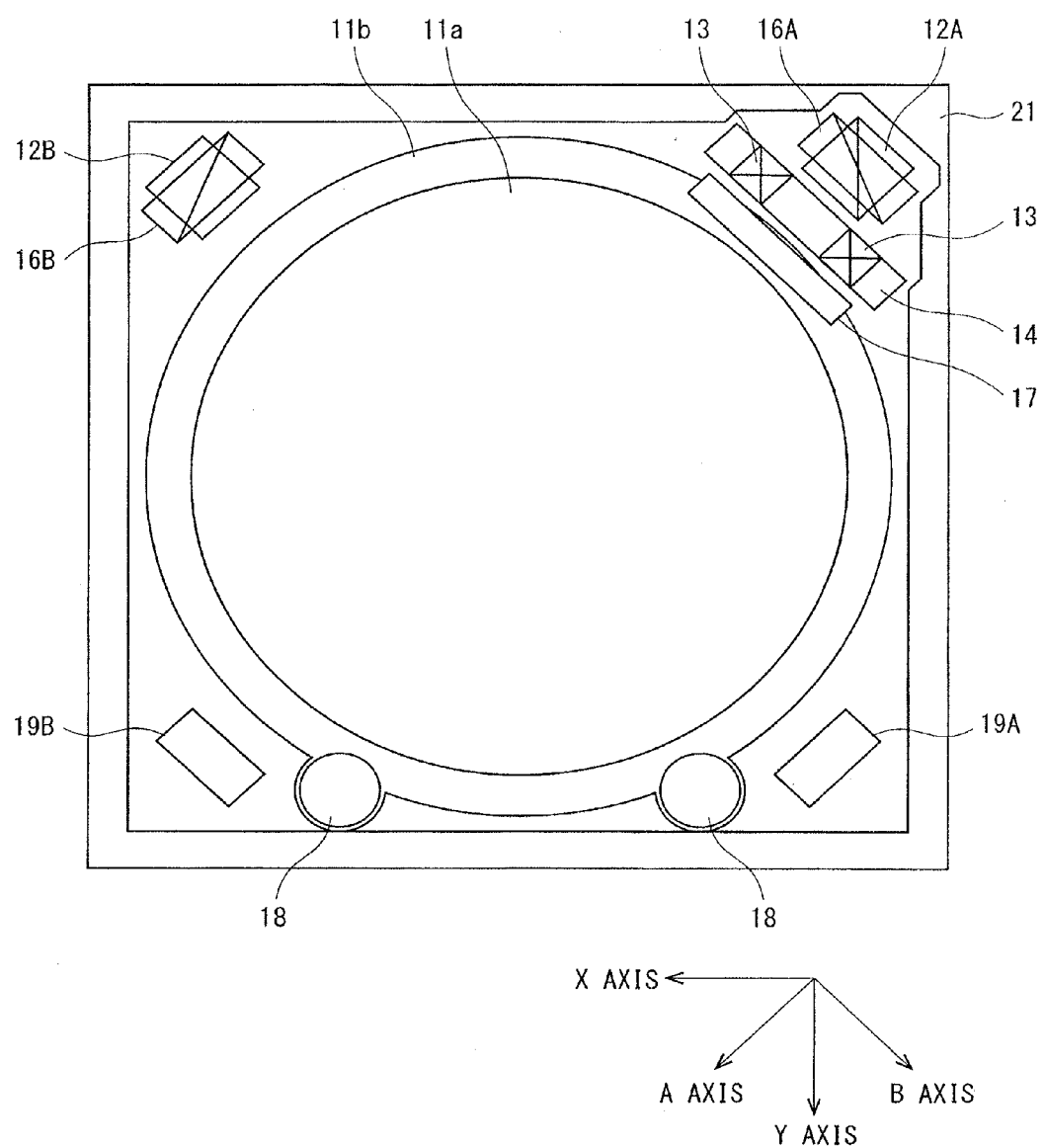
FIG. 23 is a top view of the position detection apparatus illustrated in FIG. 22.

FIG. 22 is a perspective view illustrating the position detection apparatus in Embodiment 3 of the present invention. FIG. 23 is a top view of the position detection apparatus illustrated in FIG. 22, which is a view of the position detection apparatus when viewed in a direction of an optical axis a of a lens. Reference numeral 12A represents a permanent magnet (i.e., A axis magnet for both OIS and AF), reference numeral 12B represents a B axis OIS magnet, reference numeral 13 represents an AF coil, reference numeral 14 represents an AF hall element, reference numeral 15A represents an A axis OIS coil, reference numeral 15B represents a B axis OIS coil, reference numeral 16A represents an A axis OIS hall element, reference numeral 16B represents a B axis OIS hall element, reference numeral 17 represents a yoke, reference numeral 18 represents an AF driving shaft, reference numeral 19A represents an A axis OIS driving shaft, reference numeral 19B represents a B axis OIS driving shaft, and reference numeral 21 represents a camera module. Here, a "lens barrel" is defined as a member that holds the lens.

The position detection apparatus in Embodiment 3 of the present invention includes position sensors 16A and 16B that are arranged in a first direction orthogonal to an optical axis of the lens 11a accommodated in the camera module 21 and a second direction orthogonal to the first direction. Each of the position sensors 16A and 16B is arranged at any one of four corners inside the camera module 21.

Further, the first direction is a direction different from directions of sides of the camera module, and in one embodiment, a direction that forms an angle of 45 degrees with respect to the direction of the sides of the camera module. Further, the second direction is a direction different from the directions of the sides of the camera module, and in another embodiment, the second direction that forms an angle of 45 degrees with respect to the direction of the sides of the camera module.

Further, in the top view of FIG. 23, in one embodiment, the position sensor 16A is arranged so that the first direction forms the angle of 45 degrees with respect to the direction of the sides of the camera module 21, and the position sensor 16B is arranged so that the second direction forms the angle of 45 degrees with respect to the direction of the sides of the camera module 21.

Further, the position sensor 16A arranged in the first direction is an A axis OIS hall element, and the position sensor 16B arranged in the second direction is a B axis OIS hall element.

Further, by setting the first direction as the A axis and the second direction as the B axis, the positions on the A axis and the B axis are detected, and the positions of the lens on respective axes obtained by axis-converting the axes by the angle of 45 degrees are sensed. Here, in FIG. 23, in one embodiment, when the magnet 12A, the A axis OIS hall element 16A, and the A axis OIS coil 15A are arranged in a state of being rotated by the angle of 45 degrees from the state illustrated in FIG. 23 so as to detect the position in the same direction as those of the sides of the camera module 21, it is also necessary to rotate the AF coil 13 and the AF hall element 14 by the angle of 45 degrees. In this case, the AF hall element 14 protrudes outside from the module. Namely, the camera module itself is made to be large in size. In other words, as described above, downsizing of the module is achievable by providing the arrangement so that the positions on the A axis and the B axis are detected and the positions of the lens on the respective axes obtained by axis-converting the axes by the angle of 45 degrees are sensed.

Further, the position detection apparatus in some embodiments of the present invention will be described in detail with reference to FIG. 23. The position detection apparatus includes an AF mechanism that moves along the optical axis of the lens 11a accommodated in the camera module 21, and an OIS mechanism that moves in the first direction orthogonal to the optical axis.

In addition, the permanent magnet 12A is commonly used as an AF magnet used in the AF mechanism and an OIS magnet used in the OIS mechanism. Furthermore, the AF coil 13 is provided in the vicinity of the permanent magnet 12A.

The first position sensor 14 detects the position of the lens 11a driven by the AF coil 13. In addition, the OIS coil 15A is provided in the vicinity of the permanent magnet 12A. Further, the second position sensor 16A detects the position of the lens 11a driven by the OIS coil 15A.

The first position sensor 14 and the second position sensor 16A are arranged in any one of four corners inside the camera module 21.

Further, the OIS magnet 12B is provided in the second direction orthogonal to the first direction. In addition, the OIS coil 15B is provided in the vicinity of the OIS magnet 12B. Furthermore, the third position sensor 16B detects the position of the lens 11a driven by the OIS coil 15B. The third position sensor 16B is arranged in any one of four corners inside the camera module 21.

Further, the first position sensor 14 is an AF hall element, the second position sensor 16A is an A axis OIS hall element, and the third position sensor 16B is a B axis OIS hall element. Furthermore, the first direction is set on an A axis, and the second direction is set on a B axis. Then, the positions of the lenses on respective axes obtained by axis-converting the A axis and the B axis by an angle of 45 degrees are sensed.

With such a configuration, as described above, in one embodiment, it is possible to achieve downsizing of the module by making an arrangement so that the positions of the axes rotated at the angle of 45 degrees from the A axis and the B axis are sensed.

Namely, the position detection apparatus illustrated in FIG. 22 and FIG. 23 is a position detection apparatus that includes the AF mechanism that moves along the optical axis (i.e., Z axis) of the lens 11a held by the driver (i.e., lens barrel) 11b, and the OIS mechanism that moves in the direction orthogonal to the optical axis. The permanent magnet 12A is secured to the lens 11a, and moves according to the movement of the lens 11a. Further, the amount of movement thereof is detected by the AF hall element 14 and the A axis OIS hall element 16A.

The AF permanent magnet used in the AF mechanism and the OIS permanent magnet used in the OIS mechanism are provided as the X axis magnet 12A for both OIS and AF in the direction orthogonal to the optical axis of the lens 11a to be commonly used.

Further, the position detection apparatus in some embodiments of the present invention includes the AF coil 13 provided in the vicinity of the permanent magnet 12A, the first position sensor 14 that detects the position of the lens 11a driven by the AF coil 13, the OIS coil 15A provided in the vicinity of the permanent magnet 12A, and the second position sensor 16A that detects the position of the lens 11a driven by the OIS coil 15A. In Embodiment 3, the axial direction of the AF coil 13 is set as the direction (i.e., A axis direction) orthogonal to the optical axis, and the axial direction of the OIS coils 15A and 15B is set as the direction parallel to the optical direction. By making the axial direction of the AF coil and the axial direction of the OIS coil orthogonal to each other, it is possible to achieve downsizing, but the axial direction of the AF coil and the axial direction of the OIS coil is not necessarily orthogonal to each other.

In addition, the AF hall element 14 detects the position of the lens 11a driven by the AF coil 13. In FIG. 22, the AF coil 13 and the AF hall element 14 are arranged on the identical plane at an intermediate position between the lens 11a and the permanent magnet 12A, but the present invention is not limited to this arrangement. The AF coil 13 and the AF hall element 14 may be provided at the rear of the permanent magnet 12A with respect to the lens 11a, or may not be arranged on the identical plane.

With such a configuration, when an electric current flows across the AF coil 13, it is possible to adjust the position of the lens 11a in the optical axis direction along the AF driving shaft 18 by mutual action of the magnetic field of the permanent magnet 12A and the magnetic field due to the electric current flowing across the AF coil 13.

The A axis OIS coil 15A illustrated in FIG. 22 and FIG. 23 is provided in the vicinity of the permanent magnet 12A so that the axial direction of the coil is the direction parallel to the optical axis. Further, the A axis OIS hall element 16A detects the position of the lens 11a driven by the A axis OIS coil 15A. In FIG. 22 and FIG. 23, the A axis OIS coil 15A and the A axis OIS hall element 16A are arranged in the direction orthogonal to the optical axis and in the direction parallel to the surfaces of the permanent magnet 12A with the permanent magnet 12A being interposed therebetween. However, any arrangement is applicable as far as the movement in the A axis direction of the permanent magnet that is secured to the lens 11a is detectable. The B axis OIS coil 15B and B axis OIS coil 16B are also arranged on the B axis.

The hall element 16A arranged oppositely in the A axis direction detects a magnetic force of the permanent magnet 12A opposite to the hall element 16A, so as to detect a first position based on the movement in the A axis direction. The hall element 16B arranged oppositely in the B axis direction detects a magnetic force of the permanent magnet 12B opposite to the hall element 16B, so as to detect a second position based on the movement in the B axis direction.

The A axis OIS coil 15A and the B axis OIS coil 15B drive the lens 11a in the A axis direction along the A axis OIS driving shaft 19A and in the B axis direction along the B axis OIS driving shaft 19B, in cooperation with the permanent magnets 12A and 12B. In addition, a combination of the OIS coils 15A and 15B and the permanent magnets 12A and 12B functions as a voice coil motor (i.e., VCM).

Figure 24:
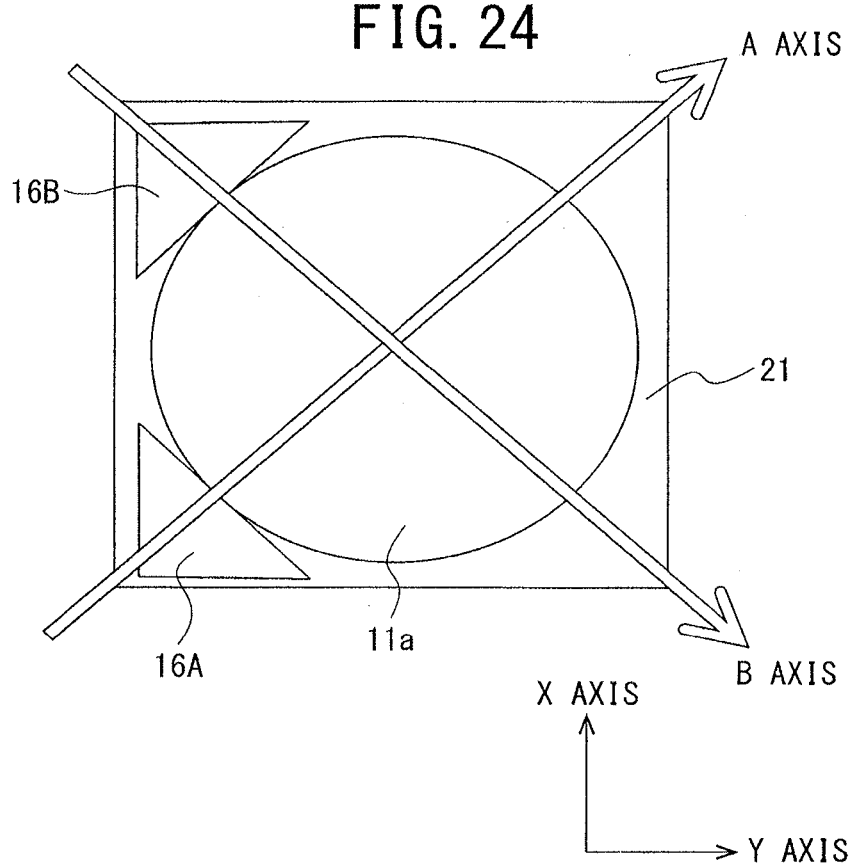
FIG. 24 is a diagram illustrating a case where a detection axis of a position sensor in the position detection apparatus in some embodiments of the present invention is converted.

FIG. 24 is a diagram illustrating a case where the detection axis of the position sensor in the position detection apparatus in Embodiment 3 of the present invention is converted. The positions of the X axis and the Y axis are sensed by axis-converting the A axis and the B axis illustrated in FIG. 23. Then, since a signal from a gyro sensor correspond to the X axis and the Y axis, it is necessary to convert the A axis and the B axis into the X axis and the Y axis. Since the A axis and the B axis are axes that are respectively inclined by the angle of 45 degrees, the axis conversion may be performed. By converting an AB axis coordinate system into an XY axis coordinate system, it is possible to use the related art post-stage apparatus corresponding to the lens position detected in the XY axis coordinate system without change.

Figure 25:
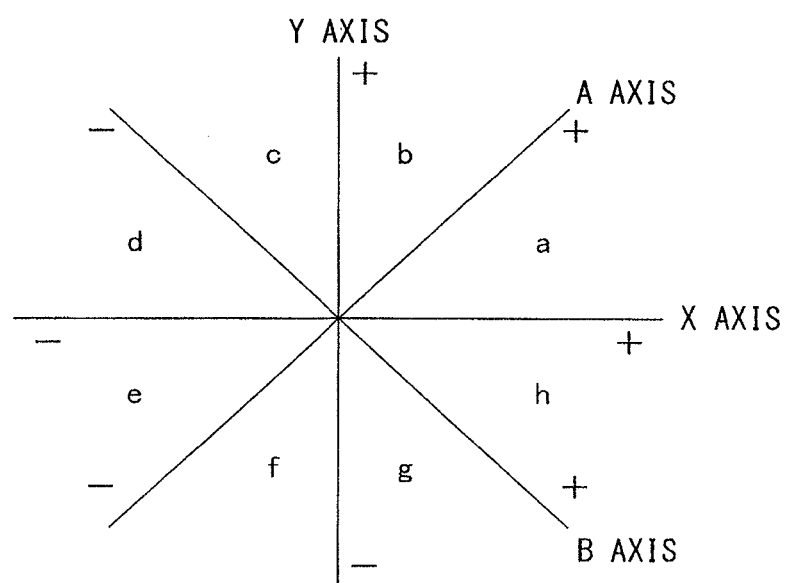
FIG. 25 is a diagram illustrating calculation of axis conversion.

FIG. 25 is a diagram illustrating calculation of the axis conversion.

The A axis and the B axis are inclined by the angle of 45 degrees with respect to the X axis and the Y axis. Herein, "a" area is an area that satisfies a positive X axis, a positive Y axis, a positive A axis, and a positive B axis;

"b" area is an area that satisfies the positive X axis, the positive Y axis, the positive A axis, and a negative B axis;

"c" area is an area that satisfies a negative X axis, the positive Y axis, the positive A axis, and the negative B axis;

"d" area is an area that satisfies the negative X axis, the positive Y axis, a negative A axis, and the negative B axis;

"e" area is an area that satisfies the negative X axis, a negative Y axis, the negative A axis, and the negative B axis;

"f" area is an area that satisfies the negative X axis, the negative Y axis, the negative A axis, and the positive B axis;

"g" area is an area that satisfies the positive X axis, the negative Y axis, the negative A axis, and the positive B axis; and "h" area is an area that satisfies the positive X axis, the negative Y axis, the positive A axis, and the positive B axis.

Further, a value on the A axis is represented as "A", and a value on the B axis is represented as "B".

The calculation of the X axis position and the Y axis position in the respective areas "a" to "h" is illustrated in Table 2.

1) First, the following determinations are made from the values on the A axis and B axis.

The A axis is positive and the B axis is positive ("a" and "h" areas).

The A axis is positive and the B axis is negative ("b" and "c" areas).

The A axis is negative and the B axis is negative ("d" and "e" areas).

The A axis is negative and the B axis is positive ("f" and "g" areas).

2) Next, the respective areas are determined from an absolute value of A and an absolute value of B.

In the "a" and "h" areas, when $|A|>|B|$ is satisfied, the "a" area is determined, when $|A|<|B|$ is satisfied, the "h" area is determined, and when $|A|=|B|$ is satisfied, "on the X axis" is determined.

In the "b" and "c" areas, when $|A|>|B|$ is satisfied, the "b" area is determined, when $|A|<|B|$ is satisfied, the "c" area is determined, and when $|A|=|B|$ is satisfied, "on the Y axis" is determined.

In the "d" and "e" areas, when $|A|>|B|$ is satisfied, the "e" area is determined, when $|A|<|B|$ is satisfied, the "d" area is determined, and when $|A|=|B|$ is satisfied, "on the X axis" is determined.

In the "f" and "g" areas, when $|A|>|B|$ is satisfied, the "f" area is determined, when $|A|<|B|$ is satisfied, the "g" area is determined, and when $|A|=|B|$ is satisfied, "on the Y axis" is determined.

3) After the determination of the areas, the following calculation in Table 2 is performed.

TABLE 2

| Area | X axis position | Y axis position |
| --- | --- | --- |
| a | $(A - B)/\sqrt{2} + B\sqrt{2}$ | $(A - B)/\sqrt{2}$ |
| b | $(A + B)/\sqrt{2}$ | $(A + B)/\sqrt{2} - B\sqrt{2}$ |
| c | $(A + B)/\sqrt{2}$ | $-(A + B)/\sqrt{2} + A\sqrt{2}$ |
| d | $(B - A)/\sqrt{2} + A\sqrt{2}$ | $(A - B)/\sqrt{2}$ |
| e | $(A - B)/\sqrt{2} + B\sqrt{2}$ | $(A - B)/\sqrt{2}$ |
| f | $(A + B)/\sqrt{2}$ | $(A + B)/\sqrt{2} - B\sqrt{2}$ |
| g | $(A + B)/\sqrt{2}$ | $-(A + B)/\sqrt{2} + A\sqrt{2}$ |
| h | $(B - A)/\sqrt{2} + A\sqrt{2}$ | $(A - B)/\sqrt{2}$ |

As described above, when the position detection is performed by using the axis conversion, similarly, when the position sensor arranged inside the lens module is arranged at any one of four corners of the lens module, it is possible to achieve downsizing.

Further, since the output obtained in the AB axis coordinate system is converted to the XY axis coordinate system in which the direction of the side of the camera module is the X axis direction and the Y axis direction, it is possible to use the related art post-stage apparatus corresponding to the lens position detected in the XY axis coordinate system as it is.

Embodiment 4

Figure 26A:
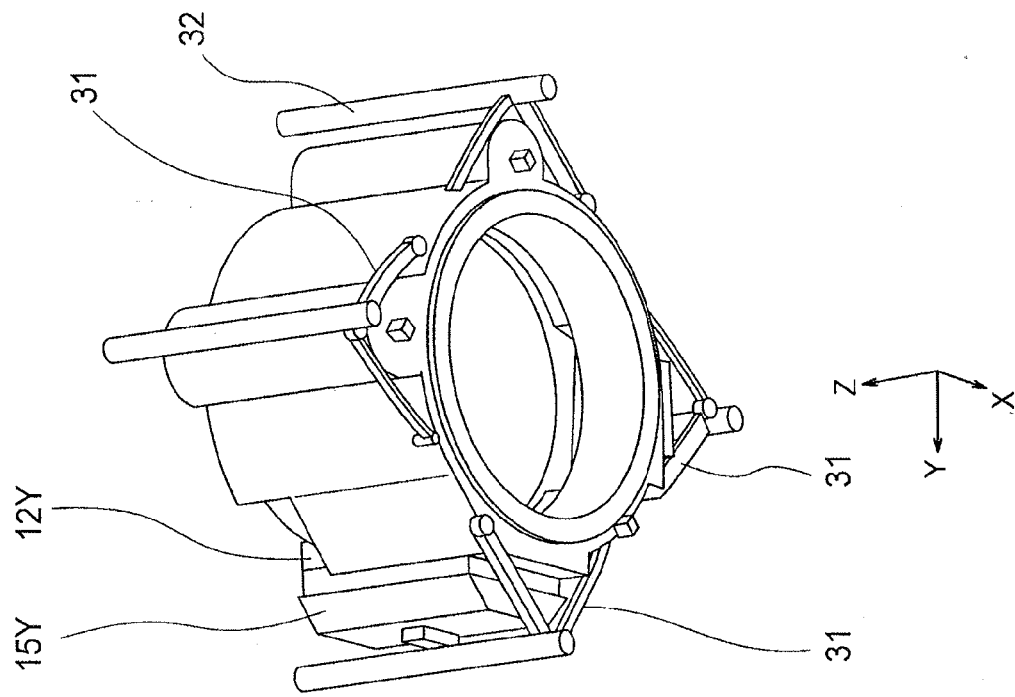
Figure 26B:
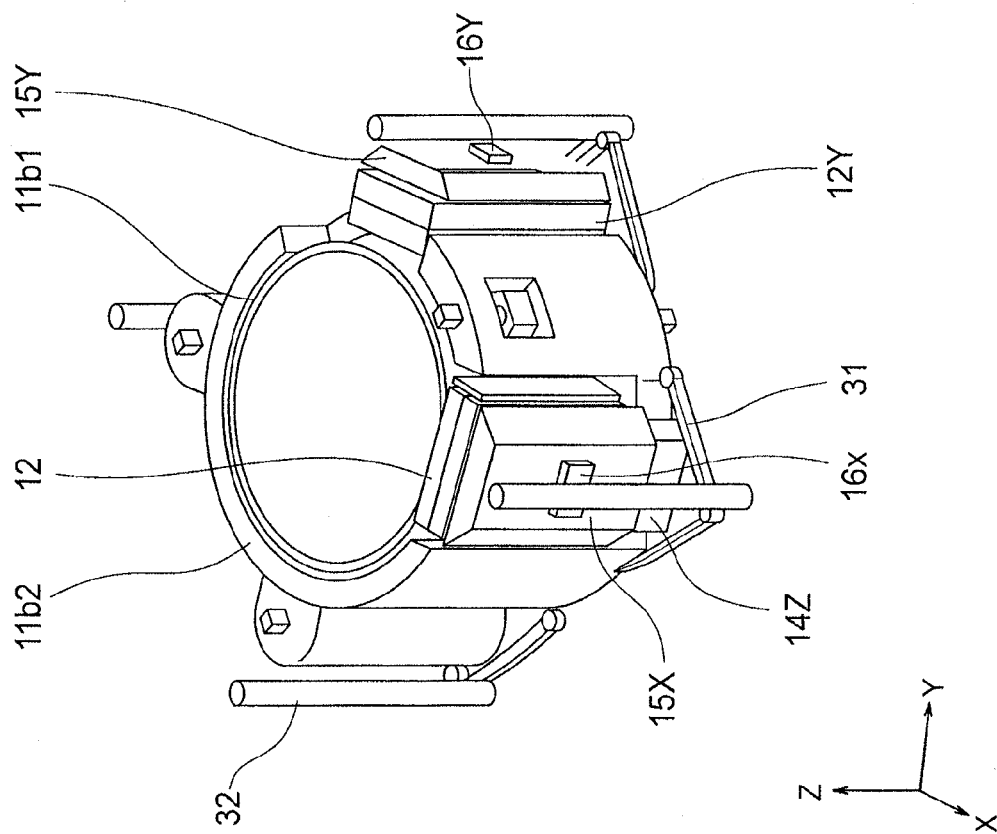

FIG. 26A and FIG. 26B are perspective views illustrating the position detection apparatus in Embodiment 4 of the present invention, in which FIG. 26A is a perspective view when viewed from the top, and FIG. 26B is a perspective view when viewed from the bottom.

FIG. 27A to FIG. 27C are assembly diagrams of the position detection apparatus illustrated in FIG. 26A and FIG. 26B, in which FIG. 27A is a perspective view of the first driver, FIG. 27B is a perspective view of the second driver, and FIG. 27C is a diagram illustrating a state where the first driver is combined with the second driver. Reference numerals 18a, 18b, and 18c represent shafts, reference numerals 22a, 22b, and 22c represent projections, and reference numeral 23 represents a cutout portion.

A difference from the position detection apparatus described in FIG. 14A to FIG. 14C is in that in FIG. 14A and FIG. 14B, the Z axis direction driving rails (i.e., shafts) 20Z are fitted by two projections 22 integrally provided on the outer peripheral surface of the first driver 11b1 of the driver 11b configured by the lens barrel 11b1 that is the first driver and the second driver 11b2, whereas in Embodiment 4, there are provided three shafts 18a, 18b, and 18c fitted by three projections 22a, 22b, and 22c. Namely, the main difference is in the three-point support.

The position detection apparatus in Embodiment 4 includes the AF mechanism that moves along the optical axis of the lens 11a, and the OIS mechanism that moves in the direction orthogonal to the optical axis.

The driver 11b holds the lens 11a. Further, the AF magnet 2 illustrated in FIG. 1 is arranged in the vicinity of the driver 11b, and is used in the AF mechanism. In addition, the AF coil 3 is provided in the vicinity of the AF magnet 2.

The AF coil 3 is arranged to be along an inner periphery of the second driver 11b2, and its axis direction is parallel to the optical axis of the lens 11a. With such an arrangement, it is possible to achieve a small-sized position detection apparatus.

Further, the X axis OIS magnet 12X and the Y axis OIS magnet 12Y are arranged in the vicinity of the driver 11b, and are used in the OIS mechanism. In addition, the X axis OIS coil 15X is provided in the vicinity of the X axis OIS magnet 12X. The Y axis OIS coil 15Y is provided in the vicinity of the Y axis OIS magnet 12Y.

Furthermore, the first position sensor 4 detects the position of the lens 11a driven by the AF coil 3. In addition, the second position sensor 16X detects the position of the lens 11*a* driven by the X axis OIS coil 12X. Further, the third position sensor 16Y detects the position of the lens 11*a* driven by the Y axis OIS coil 15Y.

As illustrated in FIG. 2, in some embodiments, the common magnet 12 is provided to be commonly used as the AF magnet 2 and the X axis OIS magnet 12X. Further, the driver 11*b* includes the lens barrel 11*b*1 that is the first driver, and the second driver 11*b*2.

The elastic member 31 is a letter S-shaped spring or an annular plate spring. Further, the first position sensor, the second position sensor, and the third position sensor are magnetic sensors.

Further, the AF coil 3 is provided so that the axial direction of the coil is parallel to the optical axis. In addition, the OIS coils 15X and 15Y are provided so that the axial direction of the coils is orthogonal to the optical axis.

The first position sensor is, in some embodiments, a first hall element, the second position sensor is a second hall element, and the third position sensor is a third hall element, in which a normal direction of a magnetic sensitivity surface of the first hall element and a normal direction of a magnetic sensitivity surface of the second hall element are same, and the normal direction of the magnetic sensitivity surface of the first hall element and a normal direction of the magnetic sensitivity surface of the third hall element are different from each other.

Further, the first position sensor is, in some embodiments, the first hall element, the second position sensor is the second hall element, and the third position sensor is the third hall element, in which the first hall element, the second hall element, and the third hall element are arranged so that the normal directions of the magnetic sensitivity surfaces are orthogonal to the optical axis and the normal directions of the magnetic sensitivity surfaces of the first and second hall elements and the normal direction of the magnetic sensitivity surface of the third hall element are different from each other.

Further, the first position sensor is, in some embodiments, the first hall element, the second position sensor is the second hall element, and the third position sensor is the third hall element, in which the axial direction of the AF coil is parallel to the optical axis, and the normal direction of the magnetic sensitivity surface of the first hall element is orthogonal to the optical axis. In other words, the axial direction of the AF coil is different from the normal direction of the magnetic sensitivity surface of the first hall element. The axial direction of the X axis OIS coil and the normal direction of the magneto-optical surface of the second hall element are same, and are orthogonal to the optical axis. The axial direction of the Y axis OIS coil and the normal direction of the magneto-optical surface of the third hall element are same, and are orthogonal to the optical axis.

Further, in some embodiments, the X axis OIS coil 15X is provided so that the axis direction of the coil is orthogonal to the optical axis. Further, the Y axis OIS coil 15Y is provided so that the axis direction of the coil is orthogonal to the optical axis.

The axial direction of the X axis OIS coil 15X and the axial direction of the Y axis OIS coil 15Y are different from each other, and are orthogonal to each other, in some embodiments.

By arranging the magnetic sensitivity surfaces of the first to third hall elements, the axial direction of the X axis OIS coil 15X, and the axial direction of the Y axis OIS coil 15Y as described above, it is possible to accommodate the respective hall elements and the respective OIS coils in the corner parts of the lens module, and to realize a small-sized position detection apparatus.

A magnetization direction of the AF magnet 2 is not particularly limited as long as the magnetization direction is a direction where the movement is made in the optical axis direction (i.e., Z axis direction) when an electric current flows across the AF coil 3. Further, a magnetization direction of the X axis OIS magnet 12X is not particularly limited as long as the magnetization direction is a direction where the movement is made in the X axis direction when an electric current flows across the X axis OIS coil 15X. Further, a magnetization direction of the Y axis OIS magnet 12Y is not particularly limited as long as the magnetization direction is a direction where the movement is made in the Y axis direction when an electric current flows across the Y axis OIS coil 15Y.

As is apparent from FIG. 27A to FIG. 27C, in one embodiment, the permanent magnet (i.e., AF magnet) 12 is attached to the lens barrel (i.e., first driver) 11*b*1, and the Y axis OIS magnet 12Y is attached to the outside of the second driver 11*b*2. Further, the Z axis AF sensor 14Z is arranged outside the second driver 11*b*2, and the Z axis AF coil 13Z is arranged in a lower part of the outer periphery of the lens along the inside of the second driver 11*b*2.

Further, in one embodiment, in FIG. 27A, the plural shafts 18*a*, 18*b*, and 18*c* illustrated in FIG. 27B are fitted into the through holes of the plural projections 22*a*, 22*b*, and 22*c* that are integrally provided on the outer peripheral surface of the lens barrel (i.e., first driver) 11*b*1, and the lens barrel (i.e., first driver) 11*b*1 moves in the Z axis direction. In addition, only the permanent magnet (i.e., AF magnet) 12 moves together with the lens barrel (i.e., first driver) 11*b*1. Furthermore, the Z axis AF coil 13Z, the Z axis AF sensor 14Z, and the Y axis OIS magnet 12Y move together with the second driver 11*b*2.

With such a configuration, the driver 11*b* moves along the optical axis of the lens 11*a* through the shafts 18*a*, 18*b*, and 18*c*. Further, the plural projections 22*a*, 22*b*, and 22*c* and the plural shafts 18*a*, 18*b*, and 18*c* are provided at three locations to provide the three-point support.

Further, in one embodiment, the common magnet 12 that is commonly used as the AF magnet 2 and the X axis OIS magnet 12X is fitted into the cutout portion 23 of the second driver 11*b*2.

With such a configuration in which the AF mechanism and the OIS mechanism are provided and the AF magnet and the OIS magnet are commonly used, it is possible to realize a small-sized position detection apparatus capable of enhancing stability due to the support member of the driver that holds the lens in the lens module. Particularly, by providing the three-point support structure, it is possible to obtain an effect that the lens part of the camera is not inclined.

The position detection apparatuses disclosed in Embodiments 1 to 4 are examples of the position detection apparatus according to the present invention. Here, the direction of the magnetic sensitivity surface of the AF hall element is not particularly limited, and the normal direction of the magnetic sensitivity surface may be orthogonal to the optical axis, or may be parallel to the optical axis. Further, similarly, the direction of the magnetic sensitivity surface of the OIS hall element is not particularly limited, and the normal direction of the magnetic sensitivity surface may be orthogonal to the optical axis, or may be parallel to the optical axis.

Further, the magnetization direction of the magnet or the arrangement of the AF coil and the OIS coil is not also particularly limited.

In addition, the position detection may further comprise: an autofocus coil provided in a vicinity of the magnet and configured to move the lens in the optical axis direction; and an optical image stabilization coil provided in the vicinity of the magnet and configured to move the lens in a direction orthogonal to the optical axis direction.

Further, in the position detection apparatus, the first position sensor may be a first hall element, and the second position sensor may be a second hall element, the first hall element may be arranged so that a normal direction of a magnetic sensitivity surface of the first hall element may be orthogonal to or parallel to the optical axis, and the second hall element may be arranged so that a normal direction of a magnetic sensitivity surface of the second hall element may be orthogonal to or parallel to the optical axis.

Furthermore, the position detection apparatus may further comprise a yoke configured to form a magnetic path of a magnetic flux from the magnet.

Moreover, the position detection apparatus may further comprise: an autofocus mechanism configured to control the position of the lens in the optical axis direction; and an optical image stabilization mechanism configured to control the position of the lens in the plane orthogonal to the optical axis direction, wherein the autofocus mechanism may be configured to detect the position of the lens in the optical axis direction from an output of the first position sensor and is configured to feed back a detected result to a lens position controller that controls the position of the lens, so as to control the position of the lens in the optical axis direction, and wherein the optical image stabilization mechanism may be configured to detect the position of the lens on the plane orthogonal to the optical axis direction from an output of the second position sensor and is configured to feed back a detected result to the lens position controller that controls the position of the lens, so as to control the position of the lens on the plane orthogonal to the optical axis direction.

Additionally, in the position detection apparatus, the autofocus mechanism may be configured to control the position of the lens based on the output of the second position sensor for the optical image stabilization.

Further, in the position detection apparatus, the optical image stabilization mechanism may be configured to control the position of the lens based on the output of the first position sensor for the autofocus.

Furthermore, the position detection apparatus may further comprise: a driver configured to hold the lens; a support that is a terminal for supplying an electric current and/or a terminal for inputting or outputting a signal; and a plurality of elastic members configured to be connected to the driver and each of a plurality of the supports that is the terminal, wherein the plurality of the elastic members may be connected to the first position sensor, the second position sensor, and at least one of the autofocus coil or the optical image stabilization coil.

In addition, in the position detection apparatus, the elastic member may include a conductive member.

Further, in the position detection apparatus, the elastic member may be configured to be a letter S-shaped spring or an annular plate spring.

Furthermore, the position detection apparatus may further comprise a camera module configured to accommodate the lens, the magnet, the first position sensor, and the second position sensor.

Moreover, in the position detection apparatus, the first position sensor and/or the second position sensor may be arranged in any one of four corners inside the camera module.

Additionally, the position detection apparatus may further comprise a third position sensor for optical image stabilization configured to detect the position of the lens on the plane orthogonal to the optical axis direction, the third position sensor being different from the second position sensor, wherein the second position sensor and/or the third position sensor may be arranged in any one of four corners inside the camera module.

Further, in the position detection apparatus, the second position sensor may be configured to detect the position of the lens in a first direction orthogonal to the optical axis, and the third position sensor may detect the position of the lens in a second direction orthogonal to the optical axis and the first direction.

Furthermore, in the position detection apparatus, the first direction may be a direction different from a direction of a side of the camera module.

Moreover, in the position detection apparatus, the first direction may be a direction that forms an angle of 45 degrees with respect to the direction of the side of the camera module.

Further, in the position detection apparatus, the second direction may be a direction different from the direction of the side of the camera module.

In addition, in the position detection apparatus, the second direction may be a direction that forms an angle of 45 degrees with respect to the direction of the side of the camera module.

Further, the position detection apparatus may further comprise a lens position detector configured to detect the position of the lens based on an output of the second position sensor and an output of the third position sensor, wherein when an A axis is the first direction and an X axis is an axis obtained by rotating the A axis by a predetermined angle centering around the optical axis, and when a B axis is the second direction and a Y axis is an axis obtained by rotating the B axis by the predetermined angle in a same direction as the A axis centering around the optical axis, the lens position detector may be configured to detect the positions of the lens on the X axis and the Y axis.

Additionally, in the position detection apparatus, the predetermined angle may be 45 degrees.

Further, the position detection apparatus may further comprise: a driver configured to hold the lens and to include a plurality of through holes for a shaft to be fitted into; and a plurality of the shafts respectively fitted into the plurality of through holes.

Furthermore, in the position detection apparatus, the plurality of through holes and the plurality of the shafts may be provided at three or more locations to provide supports at three or more points.

In addition, in the position detection apparatus, the driver may include a first driver and a second driver, the first driver being a lens barrel.

Further, in the position detection apparatus, the first driver may be fitted into the second driver.

Furthermore, in the position detection apparatus, the driver may include a plurality of projections that is integrally provided on an outer peripheral surface of the driver and that has the plurality of through holes, and the plurality of the shafts may be respectively fitted into the plurality of through holes of the plurality of projections.

Additionally, in the position detection apparatus, the plurality of projections and the plurality of the shafts may be provided at three or more locations to provide supports at three or more points.

Furthermore, in the position detection apparatus, the driver may include a first driver and a second driver, the first driver being a lens barrel, and the plurality of projections may be provided in the lens barrel that is the first driver.

Further, in the position detection apparatus, the magnet may be secured to the first driver.

Moreover, in the position detection apparatus, the magnet may be fitted into a cutout portion of the second driver.

REFERENCE SIGNS LIST 1 lens
2 permanent magnet (i.e., X axis magnet for both OIS and AF)
3 AF coil
4 AF position sensor (hall element)
5 X axis OIS coil
6 X axis OIS position sensor (hall element)
7, 17 yoke
11a lens
11b driver
11b1 first driver (lens barrel)
11b2 second driver
12 permanent magnet (X axis magnet for both OIS and AF)
12A permanent magnet (A axis magnet for both OIS and AF)
12X X axis OIS magnet
12Y Y axis OIS magnet
12B B axis OIS magnet
13 autofocus (AF) coil
13Z Z axis AF coil
14 AF hall element
14Z Z axis AF sensor
15X X axis OIS (optical image stabilizer) coil
15A A axis OIS (optical image stabilizer) coil
15Y Y axis OIS coil
15B B axis OIS coil
16X X axis OIS hall element
16A A axis OIS hall element
16Y Y axis OIS hall element
16B B axis OIS hall element
18 AF driving shaft
18a, 18b, 18c shaft
19X X axis OIS driving shaft
19A A axis OIS driving shaft
19Y Y axis OIS driving shaft
19B B axis OIS driving shaft
20Z Z-axial direction driving rail
21 camera module (housing)
22 projection
22a, 22b, 22c projection
23 cutout portion
31, 131 elastic member
32 support (power supply terminal)
111 optical axis
113 axial direction of AF coil
115 axial direction of X axis OIS coil common use.

What is claimed is:

1. A position detection apparatus, comprising:
   a first magnet for optical image stabilization configured to move as a lens moves in an optical axis direction and in an in-plane direction orthogonal to an optical axis;
   a second magnet for the optical image stabilization configured to move as the lens moves in the optical axis direction and in the in-plane direction orthogonal to the optical axis;
   a first position sensor configured to sense a first magnetic field to be changed according to a movement of the first magnet in a plane orthogonal to the optical axis direction to detect a position of the lens in the plane orthogonal to the optical axis direction;
   a second position sensor configured to sense a second magnetic field to be changed according to a movement of the second magnet in the plane orthogonal to the optical axis direction to detect the position of the lens in the plane orthogonal to the optical axis direction;
   a camera module configured to accommodate the lens, the first magnet, and the second magnet; and
   a lens position detector configured to detect the position of the lens based on an output of the first position sensor and an output of the second position sensor,
   wherein the first position sensor and the second position sensor are respectively arranged at any one of corner regions of the camera module, in a plan view when viewed from the optical axis direction,
   wherein the first position sensor is configured to detect the position of the lens in a first direction orthogonal to the optical axis,
   wherein the second position sensor is configured to detect the position of the lens in a second direction orthogonal to the optical axis,
   wherein when an A axis is the first direction and an X axis is an axis obtained by rotating the A axis by a predetermined angle centering around the optical axis, and when a B axis is the second direction and a Y axis is an axis obtained by rotating the B axis by the predetermined angle in a same direction as the A axis centering around the optical axis, the lens position detector is configured to detect the positions of the lens on the X axis and the Y axis, and
   wherein the predetermined angle is approximately 45 degrees.

2. The position detection apparatus according to claim 1, wherein the first direction is a direction forming an angle of approximately 45 degrees with respect to a direction of a side of the camera module, and
   wherein the second direction is a direction forming an angle of approximately 45 degrees with respect to the direction of the side of the camera module.

3. The position detection apparatus according to claim 1, wherein the camera module is configured to have a square shape in a top face view.

4. The position detection apparatus according to claim 1, further comprising:
   a first coil for the optical image stabilization provided in a vicinity of the first magnet and configured to drive the lens in the first direction; and
   a second coil for the optical image stabilization provided in a vicinity of the second magnet and configured to drive the lens in the second direction,
   wherein a center axis direction of the first coil and a center axis direction of the second coil are parallel to the optical axis direction.

5. The position detection apparatus according to claim 1, wherein the first position sensor and the second position sensor are hall elements.

6. The position detection apparatus according to claim 1, wherein the first magnet and the second magnet are configured to be respectively arranged at any one of four corners of the camera module, in the plan view when viewed from the optical axis direction, wherein the first position sensor is arranged oppositely to the first magnet, and wherein the second position sensor is arranged oppositely to the second magnet.

7. A position detection apparatus, comprising:

a first magnet for optical image stabilization configured to move as a lens moves in an optical axis direction and in an in-plane direction orthogonal to an optical axis;

a second magnet for the optical image stabilization configured to move as the lens moves in the optical axis direction and in the in-plane direction orthogonal to the optical axis;

a first position sensor configured to sense a first magnetic field to be changed according to a movement of the first magnet in a plane orthogonal to the optical axis direction to detect a position of the lens in the plane orthogonal to the optical axis direction;

a second position sensor configured to sense a second magnetic field to be changed according to a movement of the second magnet in the plane orthogonal to the optical axis direction to detect the position of the lens in the plane orthogonal to the optical axis direction;

a camera module configured to accommodate the lens, the first magnet, and the second magnet and a lens position detector configured to detect the position of the lens based on an output of the first position sensor and an output of the second position sensor, wherein the first position sensor and the second position sensor are respectively arranged at any one of corner regions of the camera module, in a plan view when viewed from the optical axis direction, wherein the first position sensor is configured to detect the position of the lens in a first direction orthogonal to the optical axis, wherein the second position sensor is configured to detect the position of the lens in a second direction orthogonal to the optical axis, wherein when an A axis is the first direction and an X axis is an axis obtained by rotating the A axis by a predetermined angle centering around the optical axis, and when a B axis is the second direction and a Y axis is an axis obtained by rotating the B axis by the predetermined angle in a same direction as the A axis centering around the optical axis, the lens position detector is configured to detect the positions of the lens on the X axis and the Y axis, and wherein the lens position detector is configured to carry out an axis conversion for the A axis and the B axis based on the output of the first position sensor and the output of the second position sensor, and to detect the position of the lens in the X axis and in the Y-axis.

8. A position detection apparatus that detects a position of a lens in a plane orthogonal to an optical axis direction of the lens to detect a position for optical image stabilization, the position detection apparatus comprising:

a first magnet for optical image stabilization configured to move as the lens moves in the optical axis direction and in an in-plane direction orthogonal to an optical axis;

a second magnet for the optical image stabilization configured to move as the lens moves in the optical axis direction and in the in-plane direction orthogonal to the optical axis;

a first position sensor for the optical image stabilization configured to sense a first magnetic field to be changed according to a movement of the first magnet in a plane orthogonal to the optical axis direction to detect a position of the lens in the plane orthogonal to the optical axis direction;

a second position sensor for the optical image stabilization configured to sense a second magnetic field to be changed according to a movement of the second magnet in the plane orthogonal to the optical axis direction to detect the position of the lens in the plane orthogonal to the optical axis direction;

a camera module configured to accommodate the lens, the first magnet, and the second magnet, the camera module being configured to have a square shape in a top view; and a lens position detector configured to detect the position of the lens based on an output of the first position sensor and an output of the second position sensor, wherein the first position sensor and the second position sensor are respectively arranged at any one of four corners of the camera module, in a plan view when viewed from the optical axis direction, wherein the first position sensor is configured to detect the position of the lens in a first direction orthogonal to the optical axis, wherein the second position sensor is configured to detect the position of the lens in a second direction orthogonal to the optical axis, wherein when an A axis is the first direction and an X axis is an axis obtained by rotating the A axis by a predetermined angle centering around the optical axis, and when a B axis is the second direction and a Y axis is an axis obtained by rotating the B axis by the predetermined angle in a same direction as the A axis centering around the optical axis, the lens position detector is configured to detect the positions of the lens on the X axis and the Y axis, and wherein the predetermined angle is approximately 45 degrees.

9. The position detection apparatus according to claim 8, wherein the first direction is a direction forming an angle of approximately 45 degrees with respect to a direction of a side of the camera module, and wherein the second direction is a direction forming an angle of approximately 45 degrees with respect to the direction of the side of the camera module.

10. The position detection apparatus according to claim 8, further comprising:

a first coil for the optical image stabilization provided in a vicinity of the first magnet and configured to drive the lens in the first direction; and a second coil for the optical image stabilization provided in a vicinity of the second magnet and configured to drive the lens in the second direction, wherein a center axis direction of the first coil and a center axis direction of the second coil are parallel to the optical axis direction.

11. The position detection apparatus according to claim 8, wherein the first position sensor and the second position sensor are hall elements.

12. The position detection apparatus according to claim 8, wherein the first magnet and the second magnet are configured to be respectively arranged at any one of four corners of the camera module, in the plan view when viewed from the optical axis direction, wherein the first position sensor is arranged oppositely to the first magnet, and wherein the second position sensor is arranged oppositely to the second magnet.

13. A position detection apparatus that detects a position of a lens in a plane orthogonal to an optical axis direction of the lens to detect a position for optical image stabilization, the position detection apparatus comprising:
- a first magnet for optical image stabilization configured to move as the lens moves in the optical axis direction and in an in-plane direction orthogonal to an optical axis;
- a second magnet for the optical image stabilization configured to move as the lens moves in the optical axis direction and in the in-plane direction orthogonal to the optical axis;
- a first position sensor for the optical image stabilization configured to sense a first magnetic field to be changed according to a movement of the first magnet in a plane orthogonal to the optical axis direction to detect a position of the lens in the plane orthogonal to the optical axis direction;
- a second position sensor for the optical image stabilization configured to sense a second magnetic field to be changed according to a movement of the second magnet in the plane orthogonal to the optical axis direction to detect the position of the lens in the plane orthogonal to the optical axis direction;
- a camera module configured to accommodate the lens, the first magnet, and the second magnet, the camera module being configured to have a square shape in a top view; and
- a lens position detector configured to detect the position of the lens based on an output of the first position sensor and an output of the second position sensor,
- wherein the first position sensor and the second position sensor are respectively arranged at any one of four corners of the camera module, in a plan view when viewed from the optical axis direction,
- wherein the first position sensor is configured to detect the position of the lens in a first direction orthogonal to the optical axis,
- wherein the second position sensor is configured to detect the position of the lens in a second direction orthogonal to the optical axis,
- wherein when an A axis is the first direction and an X axis is an axis obtained by rotating the A axis by a predetermined angle centering around the optical axis, and when a B axis is the second direction and a Y axis is an axis obtained by rotating the B axis by the predetermined angle in a same direction as the A axis centering around the optical axis, the lens position detector is configured to detect the positions of the lens on the X axis and the Y axis, and
- wherein the lens position detector is configured to carry out an axis conversion for the A axis and the B axis based on the output of the first position sensor and the output of the second position sensor, and to detect the position of the lens in the X axis and in the Y-axis.

14. A position detection apparatus comprising:
- a first magnet for optical image stabilization configured to move as a lens moves in an optical axis direction and in an in-plane direction orthogonal to an optical axis;
- a second magnet for the optical image stabilization configured to move as the lens moves in the optical axis direction and in the in-plane direction orthogonal to the optical axis;
- a first position sensor configured to sense a first magnetic field to be changed according to a movement of the first magnet in a plane orthogonal to the optical axis direction to detect a position of the lens in the plane orthogonal to the optical axis direction;
- a second position sensor configured to sense a second magnetic field to be changed according to a movement of the second magnet in the plane orthogonal to the optical axis direction to detect the position of the lens in the plane orthogonal to the optical axis direction; and
- a camera module configured to accommodate the lens, the first magnet, and the second magnet,
- wherein the first position sensor and the second position sensor are respectively arranged at any one of corner regions of the camera module, in a plan view when viewed from the optical axis direction,
- wherein when an A axis is a first direction orthogonal to the optical axis and an X axis is an axis obtained by rotating the A axis, the first position sensor is configured to detect the position of the lens on the A axis and the position of the lens on the X axis, and
- wherein when a B axis is a second direction orthogonal to the optical axis and the first direction and a Y axis is an axis obtained by rotating the B axis, the second position sensor is configured to detect the position of the lens on the B axis and the position of the lens on the Y axis.

15. A position detection apparatus that detects a position of a lens in a plane orthogonal to an optical axis direction of the lens to detect a position for optical image stabilization, the position detection apparatus comprising:
- a first magnet for optical image stabilization configured to move as the lens moves in the optical axis direction and in an in-plane direction orthogonal to an optical axis;
- a second magnet for the optical image stabilization configured to move as the lens moves in the optical axis direction and in the in-plane direction orthogonal to the optical axis;
- a first position sensor for the optical image stabilization configured to sense a first magnetic field to be changed according to a movement of the first magnet in a plane orthogonal to the optical axis direction to detect a position of the lens in the plane orthogonal to the optical axis direction;
- a second position sensor for the optical image stabilization configured to sense a second magnetic field to be changed according to a movement of the second magnet in the plane orthogonal to the optical axis direction to detect the position of the lens in the plane orthogonal to the optical axis direction; and
- a camera module configured to accommodate the lens, the first magnet, and the second magnet, the camera module being configured to have a square shape in a top view;
- wherein the first position sensor and the second position sensor are respectively arranged at any one of four corners of the camera module, in a plan view when viewed from the optical axis direction,
- wherein when an A axis is a first direction orthogonal to the optical axis and an X axis is an axis obtained by rotating the A axis, the first position sensor is configured to detect the position of the lens on the A axis and the position of the lens on the X axis, and
- wherein when a B axis is a second direction orthogonal to the optical axis and the first direction and a Y axis is an axis obtained by rotating the B axis, the second position sensor is configured to detect the position of the lens on the B axis and the position of the lens on the Y axis.

16. A correction mechanism comprising:
- a camera module configured to accommodate a lens, a first magnet for optical image stabilization, and a second magnet for optical image stabilization;

the first magnet being arranged at a corner region in a first direction orthogonal to an optical axis direction in the camera module and configured to move as the lens moves in an in-plane direction orthogonal to an optical axis;

the second magnet being arranged at a corner region in a second direction orthogonal to the optical axis direction different from the first direction in the camera module and configured to move as the lens moves in the in-plane direction orthogonal to the optical axis;

a first hall element configured to be arranged oppositely to the first magnet in the optical axis direction and to sense a first magnetic field to be changed according to a movement of the first magnet in the plane orthogonal to the optical axis direction of the first magnet;

a second hall element configured to be arranged oppositely to the second magnet in the optical axis direction and to sense a second magnetic field to be changed according to a movement of the second magnet in the plane orthogonal to the optical axis direction of the second magnet;

a first coil for the optical image stabilization configured to be provided in a vicinity of the first magnet and configured such that an axial direction is arranged in parallel to the optical axis direction; and a second coil for the optical image stabilization configured to be provided in a vicinity of the second magnet and configured such that an axial direction is arranged in parallel to the optical axis direction, wherein when an A axis is a first direction orthogonal to the optical axis and an X axis is an axis obtained by rotating the A axis, the first hall element is configured to detect the position of the lens on the A axis and the position of the lens on the X axis, and wherein when a B axis is a second direction orthogonal to the optical axis and the first direction and a Y axis is an axis obtained by rotating the B axis, the second hall element is configured to detect the position of the lens on the B axis and the position of the lens on the Y axis.

* * * * *